(12) United States Patent
Nakamura et al.

(10) Patent No.: US 10,288,985 B2
(45) Date of Patent: May 14, 2019

(54) IMAGING DEVICE, OPTICAL DEVICE, ELECTRONIC DEVICE, VEHICLE, AND PRODUCTION METHOD FOR IMAGING DEVICE

(71) Applicant: Nidec Copal Corporation, Tokyo (JP)

(72) Inventors: Yuta Nakamura, Tokyo (JP); Ryo Kikuta, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/513,321

(22) PCT Filed: Aug. 26, 2015

(86) PCT No.: PCT/JP2015/073990
§ 371 (c)(1),
(2) Date: Mar. 22, 2017

(87) PCT Pub. No.: WO2016/047350
PCT Pub. Date: Mar. 31, 2016

(65) Prior Publication Data
US 2017/0299947 A1    Oct. 19, 2017

(30) Foreign Application Priority Data

Sep. 25, 2014 (JP) ................................ 2014-194816
Dec. 19, 2014 (JP) ................................ 2014-257877

(51) Int. Cl.
*G02B 7/00* (2006.01)
*G03B 17/12* (2006.01)
(Continued)

(52) U.S. Cl.
CPC ............ *G03B 17/12* (2013.01); *G02B 7/02* (2013.01); *G02B 7/021* (2013.01); *G02B 7/023* (2013.01);
(Continued)

(58) Field of Classification Search
CPC .. H04N 5/2254; H04N 5/2253; H04N 5/2257; H04N 5/23248; H04N 5/225; G02B 7/021; G02B 7/102; G02B 7/08; G02B 7/10; G02B 7/02; G03B 17/12; G03B 17/55
USPC .......................................................... 359/503
See application file for complete search history.

(56) References Cited

U.S. PATENT DOCUMENTS 7,663,694 B2 *   2/2010   Kurosawa ............ H04N 5/2253
                                                              257/433
2009/0122176 A1*  5/2009   Wu ....................... H04N 5/2253
                                                              348/340
(Continued)

FOREIGN PATENT DOCUMENTS

CN          101981499 A       2/2011
CN          101981914 A       2/2011
(Continued)

OTHER PUBLICATIONS

International Search Report (English and Japanese) and PCT Written Opinion (Japanese) dated Oct. 20, 2015 issued in corresponding PCT International Application No. PCT/JP2015/073990.

*Primary Examiner* — Euncha P Cherry
(74) *Attorney, Agent, or Firm* — Troutman Sanders LLP

(57) ABSTRACT

An imaging device having a lens group; a lens barrel holding the lens group; a base member holding the lens barrel; an imaging element; a fixed plate arranged facing at least part of the base member in a state in which the imaging element is fixed; and a pressing member for attaching, to the base member, the fixed plate in a state in which the fixed plate is temporarily fixed to the base member in a state in which fixed plate is movable in a direction intersecting the axial line of the lens group, relative to the base member.

21 Claims, 15 Drawing Sheets

(51) Int. Cl.
*G02B 7/02* (2006.01)
*G03B 17/55* (2006.01)
*H04N 5/225* (2006.01)
*G03B 43/00* (2006.01)

(52) U.S. Cl.
CPC ............ *G02B 7/025* (2013.01); *G02B 7/026* (2013.01); *G03B 17/55* (2013.01); *G03B 43/00* (2013.01); *H04N 5/2253* (2013.01); *H04N 5/2254* (2013.01)

(56) References Cited

U.S. PATENT DOCUMENTS

2010/0290770 A1* 11/2010 Ishizuka .............. H04N 5/2254
 396/55
2011/0013077 A1 1/2011 Okada
2011/0037893 A1 2/2011 Okada

FOREIGN PATENT DOCUMENTS

| EP | 2267525 A1 | 12/2010 |
| EP | 2285094 A1 | 2/2011 |
| JP | 07106789 A | 4/1995 |
| JP | 07183993 A | 7/1995 |
| JP | 2003249773 A | 9/2003 |
| JP | 2005070505 A | 3/2005 |
| JP | 2005-215369 A | 8/2005 |
| JP | 200521536 A | 8/2005 |
| JP | 2006254310 A | 9/2006 |
| JP | 2006270264 A | 10/2006 |
| JP | 2006276572 A | 10/2006 |
| JP | 2011077927 A | 4/2011 |
| WO | 2009119260 A1 | 10/2009 |
| WO | 2009131017 A1 | 10/2009 |

\* cited by examiner

IMAGING DEVICE, OPTICAL DEVICE, ELECTRONIC DEVICE, VEHICLE, AND PRODUCTION METHOD FOR IMAGING DEVICE

CROSS-REFERENCE TO RELATED APPLICATIONS

This is a U.S. national phase application under 35 U.S.C. § 371 of International Patent Application No. PCT/JP2015/073990, filed Aug. 26, 2015, and claims benefit of priority to Japanese Patent Application Nos. 2014-194816, filed Sep. 25, 2014 and 2014-257877, filed Dec. 19, 2014. The entire contents of these applications are hereby incorporated by reference.

FIELD OF TECHNOLOGY

The present invention relates to an imaging device, an optical device, an electronic device, a vehicle, and a method for manufacturing an imaging device.

BACKGROUND

An imaging device has been proposed that is provided with a lens barrel (a lens holder) for holding the lens group, a printed circuit board whereon an imaging element is mounted, and a lens barrel holding member for holding the lens barrel (see, for example, Japanese Unexamined Patent Application Publication No. 2005-215369, "JP '369"). The lens barrel holding member is secured to the printed circuit board. In this imaging device, it is necessary to adjust the position of the printed circuit board relative to the lens barrel holding member so that the axis of the lens barrel passes through the center of the photodetecting portion of the imaging element.

In the assembly process for the imaging device as set forth in Japanese Unexamined Patent Application Publication No. 2005-215369, there is the need to be able to adjust the position of the printed circuit board relative to the lens barrel holding member, that is, to be able to adjust the optical axis of the lens group, easily and accurately.

SUMMARY

The present invention was created in contemplation of the reasoning above, and the object thereof is to provide an imaging device, an optical device, an electronic device, a vehicle, and a manufacturing method for an imaging device, wherein the lens group optical axis adjustment can be carried out easily and accurately.

In order to achieve the object set forth above, an imaging device according to a first aspect of the present invention comprises:
 a lens group;
 a lens barrel for holding the lens group;
 a lens barrel holding member for holding the lens barrel;
 an imaging element;
 a securing plate that is disposed facing at least a portion of the lens barrel holding member in a state wherein the imaging element is secured; and
 a securing plate securing member is provided in order to attach the securing plate to the lens barrel holding member in either a provisionally secured state, wherein the securing plate has been secured provisionally to the lens barrel holding member in a state wherein movement, relative to the lens barrel holding member, is possible in a direction that crosses the optical axis of the lens group, or a secured state wherein the securing plate is secured to the lens barrel holding member.

Moreover, the securing plate securing member may have a pressing member for pressing the securing plate toward the lens barrel holding member in the provisionally secured state and in the secured state.

A securing member for securing the pressing member to the lens barrel holding member may also be provided, wherein:
 the pressing member:
 may be formed from a material that is elastically deformable, and may comprise:
 a plate-shaped flat plate portion that is disposed away from the securing plate, on the opposite side from the lens barrel holding member side of the securing plate, and that is secured to the lens barrel holding member by the securing member;
 a contacting portion for contacting at least a portion of the securing plate; and
 a connecting portion for connecting the flat plate portion and the contacting portion.

Moreover, the lens barrel holding member may have a screw hole;
 the flat plate portion may have a first through hole;
 the securing member may be structured from a screw, and may be screwed into the through hole of the lens barrel holding member in a state wherein it is inserted into the first through hole; and
 the contacting portion may be biased in a direction toward the lens barrel holding member with a biasing force that is dependent on the amount to which the securing member is screwed into the screw hole.

Moreover, the imaging device may further comprise a biasing member for biasing the lens barrel in the optical axial direction of the lens group, wherein:
 the lens barrel has a male threaded portion formed on the outer peripheral surface thereof; and
 the lens barrel holding member has a second through hole that passes through the lens barrel holding member and into which the lens barrel is inserted, wherein a female threaded portion for screwing together with the male threaded portion is formed on the inner peripheral surface of the second through hole.

Moreover, the lens barrel holding member may have a guiding portion for guiding the lens barrel so that the axis of the lens barrel will be coincident with the axis of the second through hole; and
 the lens barrel may have a guided portion that is guided by the guiding portion.

Moreover, the guiding portions may be formed on both sides of the female threaded portion in the inner peripheral surface of the second through hole; and
 the guided portions may be formed on both sides of the male threaded portion on the outer peripheral surface of the lens barrel.

Moreover, the guiding portion may be formed so as to contact at least a portion of the guided portion.

Moreover, the biasing member may be structured from a spring.

Moreover, the securing plate securing member may further comprise an adhesive agent that is interposed between the securing plate and the lens barrel holding member, wherein:
 in the secured state, the securing plate is secured by an adhesive agent to the lens barrel holding member.

Moreover, the securing plate may have an adhesive agent filling portion, that, in the plan view, has a wedge shapes, for filling with the adhesive agent.

Moreover, the imaging device may further comprise: a circuit board having the imaging element mounted on one surface side thereof and having a first electronic component mounted on the other surface side thereof, disposed on the opposite side of the securing plate from the lens barrel holding member; and the securing plate securing member is structured from an adhesive agent that is interposed between the lens barrel holding member, the circuit board, and the securing plate, and is in a fluid state in the provisionally secured state, and a cured state in the secured state.

Moreover, the first electronic component may be mounted on the circuit board, on the other surface side that is not the facing portion that faces the lens barrel holding member in the direction of the optical axis of the lens group.

Moreover, the circuit board may be structured from a sheet-shaped flexible printed circuit board and further comprises an extending portion that extends from the facing portion; and a portion of the adhesive agent may be interposed between the lens barrel holding member and the extending portion.

Moreover, the imaging device may further comprise a securing member that is long and thin, for securing the lens barrel holding member in a state wherein the lens barrel holding member protrudes toward the imaging element side, wherein:

the securing plate has a third through hole through which the securing member is inserted, passing through in the direction of thickness of the securing plate, in a state wherein there is a gap from the side face of the securing member, at a position that corresponds to the securing member that is secured to the lens barrel holding member; and a portion of the adhesive agent is disposed in a gap that is produced between the securing member and the third through hole.

Moreover, the imaging device may further comprise: a second electronic component that is mounted on the one side surface of the circuit board; and a heat dissipating grease, interposed between the lens barrel holding member and the second electronic component, for transmitting, to the lens barrel holding member, the heat that is produced by the second electronic component, wherein:

the lens barrel holding member is disposed so as to cover the one surface side of the circuit board, and has a grease filling duct for filling the heat dissipating grease between the lens barrel holding member and the second electronic component.

Moreover, the grease filling duct may be structured in the lens barrel holding member from a fourth through hole that is formed in a position that faces the second electronic component in a direction that is perpendicular to the face of the circuit board on which the imaging element and the second electronic component are mounted.

Moreover, an optical device according to a second aspect according to the present invention is provided with an imaging device as set forth above.

Moreover, an electronic device according to a third aspect according to the present invention is provided with an imaging device as set forth above.

Moreover, a vehicle according to a fourth aspect according to the present invention is provided with an imaging device as set forth above.

Moreover, a method for manufacturing and imaging device according to a fifth aspect according to the present invention includes:

a step for securing a lens group in a lens barrel;

a step force holding the lens barrel in a lens barrel holding member;

a step for disposing the securing plate, to which the imaging element is secured, facing at least a portion of the lens barrel holding member; and a step for holding the securing plate by the securing plate securing member in a state wherein the imaging element can move, relative to the lens barrel holding member, in a direction that crosses the optical axis of the lens group; and a step for securing the imaging element to the lens barrel holding member by the securing plate securing member.

The present invention enables the lens group optical axis adjustment to be carried out easily and with good accuracy.

BRIEF DESCRIPTIONS OF THE DRAWINGS

DETAILED DESCRIPTION

Imaging devices according to various examples according to the present invention will be explained in detail below in reference to the drawings.

EXAMPLE

Figure 1:
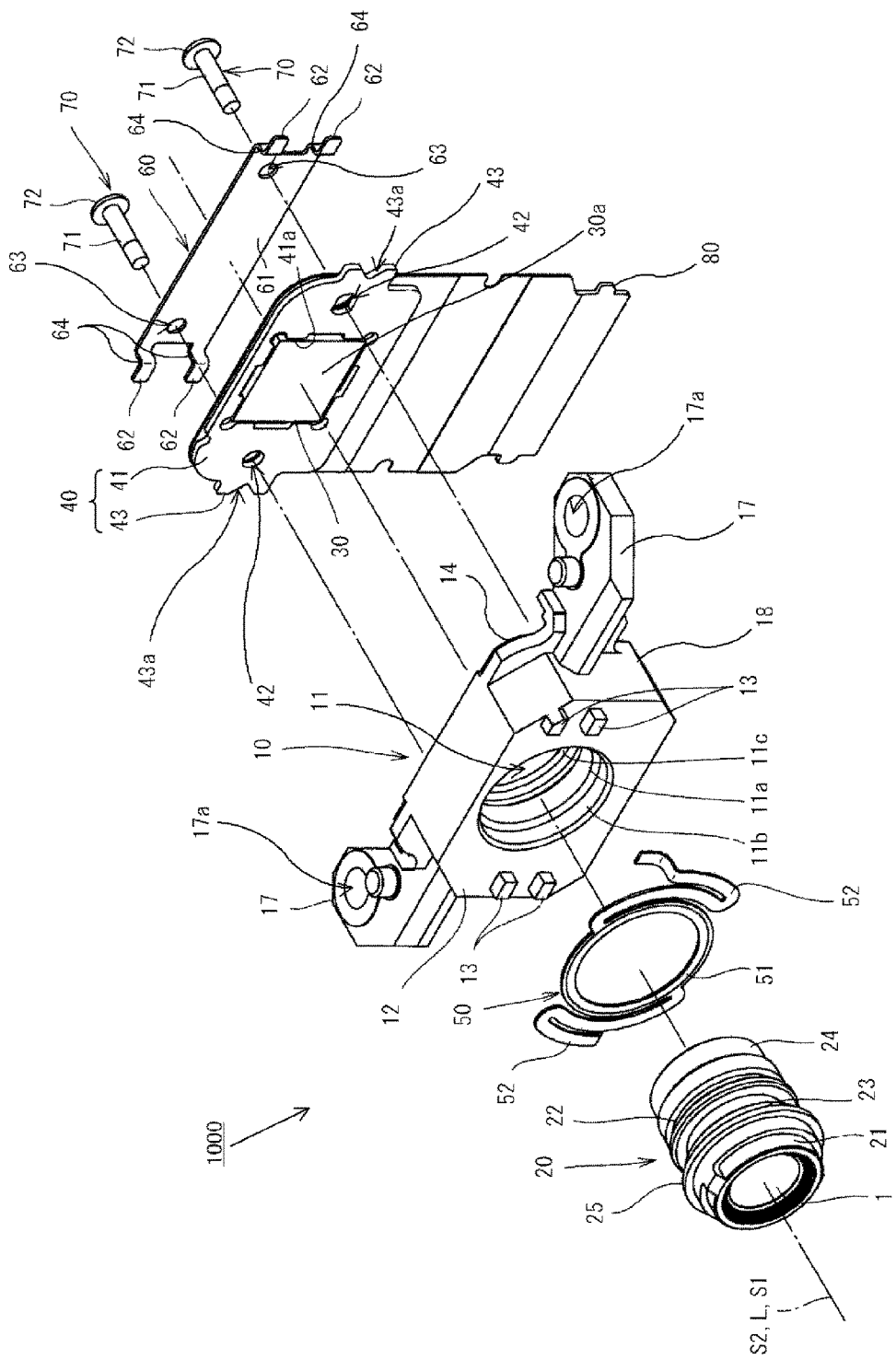
FIG. 1 is an assembly perspective diagram of an imaging device according to an example according to the present invention.
Figure 2:
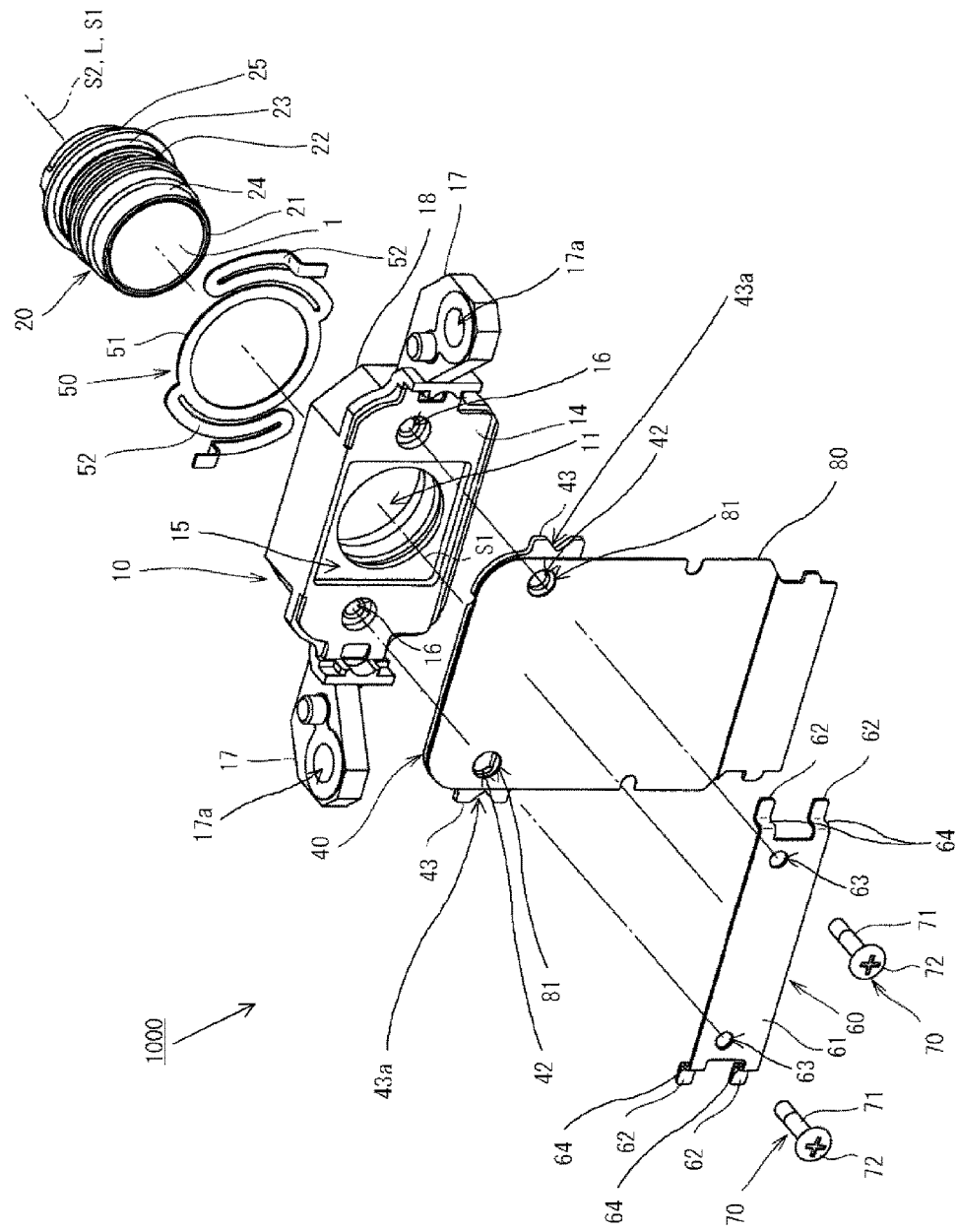
FIG. 2 is an assembly perspective diagram of an imaging device according to the example.
Figure 3:
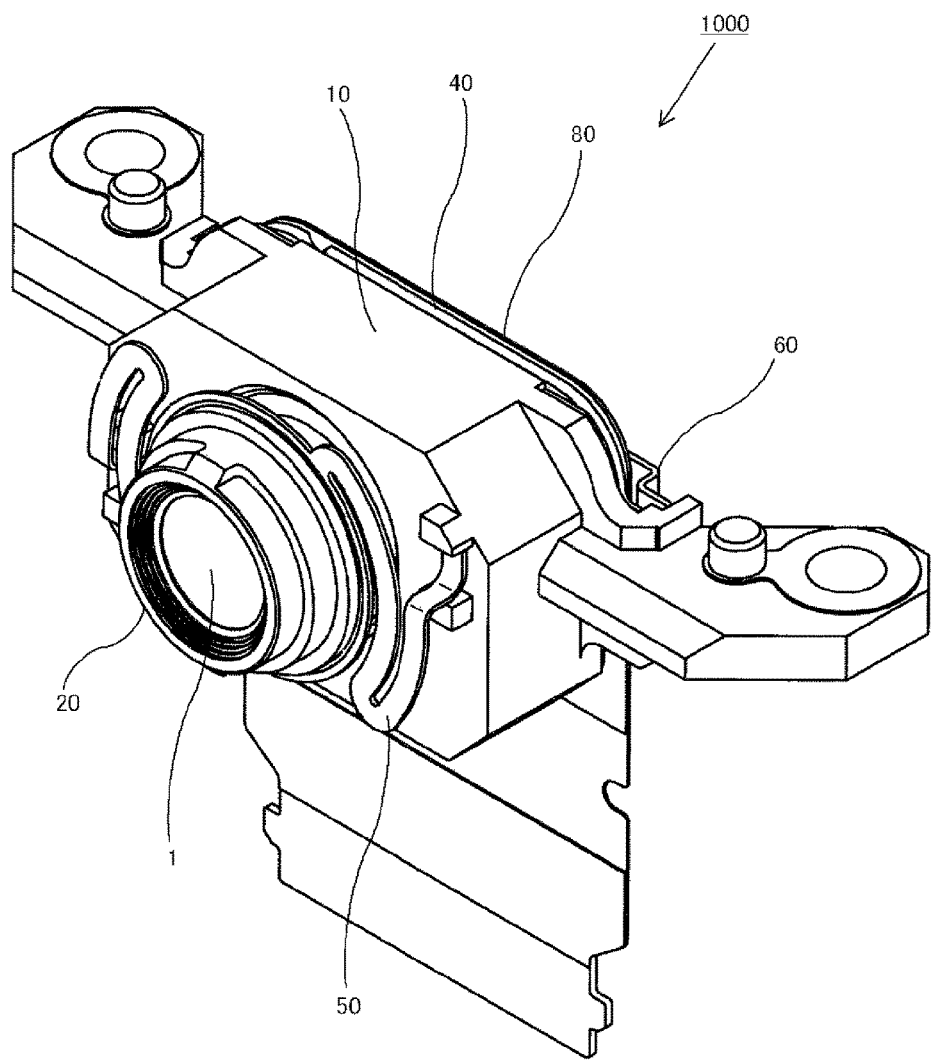
FIG. 3 is a perspective diagram of an imaging device according to the example.

The imaging device according to the present example is applied, for example, to a camera for vehicular use. As illustrated in FIG. 1 and FIG. 2, the imaging device 1000 according to the present example comprises a lens group 1, a lens barrel 20 for holding the lens group 1, a base member (a lens barrel holding member) 10, a leaf spring 50, an imaging element 30, a securing plate 40, a circuit board 80, screws 70, and a pressing member 60. As appropriate, in the below, the explanations in FIG. 1 and FIG. 2 will define the direction toward the circuit board 80 along the optical axis L of the lens group 1 as toward the "back," and the opposite direction along the optical axis L as toward the "front." The imaging device 1000 has external appearance as illustrated in FIG. 3. The imaging device 1000, as illustrated in FIG. 4, is provided with an adhesive agent 91 for securing the securing plate 40 to the base member 10.

Figure 4:
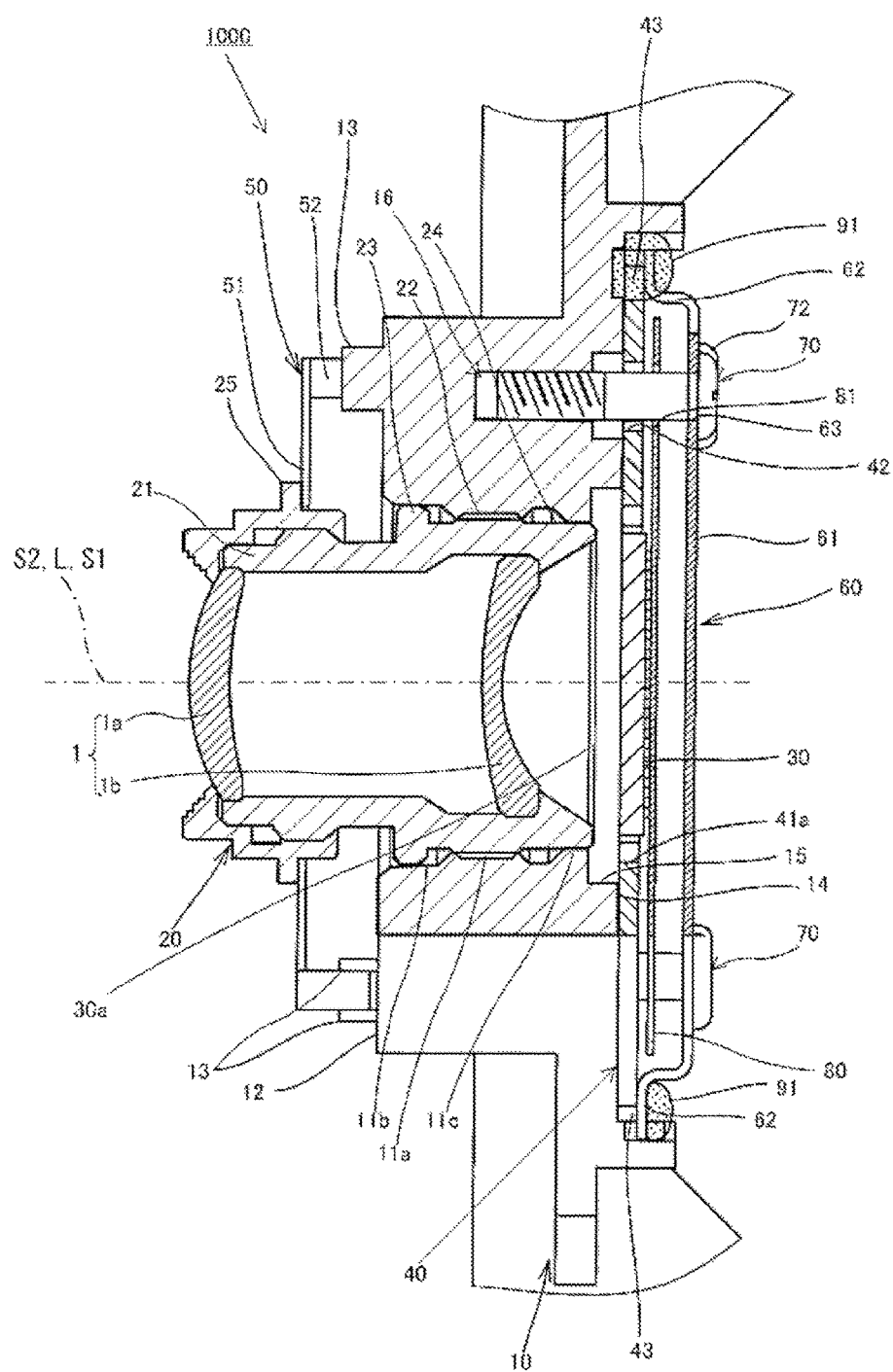
FIG. 4 is a cross-sectional view of an imaging device according to the example.

The lens group 1 is structured from two lenses 1a and 1b, as illustrated in FIG. 4. In a state wherein the lens group 1 is incorporated into the imaging device 1000, the lens 1b is disposed on the lens 1a side of the imaging element 30.

The lens barrel 20 is formed from a metal, a resin material, or the like. The lens barrel 20, as illustrated in FIG. 1 and FIG. 4, has a cylinder portion 21 that is essentially cylindrical, for holding the lens group 1 on the inside, and a ring-shaped flange portion 25 for contacting a leaf spring 50.

The two lenses 1a and 1b are secured to the inner wall of the cylinder portion 21 so that the axis S2 thereof will be aligned with the optical axis L of the lens group 1. A male threaded portion 22 is formed on the outer peripheral surface of the cylinder portion 21, toward the lens 1b side of the center portion. Moreover, a front guiding portion (guided portion) 23 that extends in the radial direction of the cylinder portion 21 is provided on the outer peripheral surface of the cylinder portion 21, on the lens 1a side of the male threaded portion 22. Furthermore, a back guiding portion (guided portion) 24, which is recessed in the radial direction of the cylinder portion 21, is provided on the outer peripheral surface of the cylinder portion 21, on the lens 1b side of the male threaded portion 22 in the direction of the axis S2 of the cylinder portion 21.

The base member 10 is formed from a metal, a resin material, or the like. The base member 10, as illustrated in FIG. 1, FIG. 2, and FIG. 4, comprises a flat rectangular lens barrel holding portion 18 for holding the lens barrel 20, and two attaching portions 17 that are secured to the vehicle, or the like, when the imaging device 1000 is attached to a vehicle, or the like. The attaching portions 17 are formed integrally with the lens barrel holding portion 18, and extend to both sides of the lens barrel holding portion 18 in the lengthwise direction.

The lens barrel holding portion 18 has a through hole (a second through hole) 11 that passes therethrough in the direction of thickness. A female threaded portion 11a is formed in essentially the center portion of the inner peripheral surface of the through hole 11. The female threaded portion 11a can be screwed together with the male threaded portion 22 of the lens barrel 20 to adjust the position of the lens barrel 20 relative to the base member 10 in the direction of the optical axis L of the lens group 1. Moreover, a front guiding portion 11b is formed on the inner peripheral surface of the through hole 11, toward the front of the female threaded portion 11a, and a back guiding portion 11c is formed toward the rear of the female threaded portion 11a. The front guiding portion 11b and the back guiding portion 11c are disposed such that, in a state wherein the base member 10 is incorporated into the imaging device 1000, the back guiding portion 11c is positioned on the imaging element 30 side of the front guiding portion 11b. When the lens barrel 20 is inserted into the through hole 11, the front guiding portion 11b is fitted into the front guiding portion 23 of the lens barrel 20, and the back guiding portion 11c is fitted into the back guiding portion 24 of the lens barrel 20. In this state, the axis S2 of the lens barrel 20, that is, the optical axis L of the lens group 1, will be coincident with the axis S1 of the through hole 11 of the base member 10.

In the outer peripheral portion of the through hole 11 in the front face 12 of the lens barrel holding portion 18, pairs of protruding portions 13 protrude at each of two locations. Given this, portions of the leaf spring 50 is held between the ring-shaped flange portion 25 of the lens barrel 20 and the front face 12 of the lens barrel holding portion 18 in a state wherein portions thereof are fitted between the protruding portions 13. Portions of the leaf spring 50 being fitted between the pairs of protruding portions 13 constrains rotation of the leaf spring 50 around the optical axis L.

Moreover, as illustrated in FIG. 2, a recessed portion 15 that, in the plan view is essentially rectangular, surrounding the through hole 11, and two screw holes 16, positioned at two locations on either side of the recessed portion 15 in the lengthwise direction of the lens barrel holding portion 18, in the outer peripheral portion of the recessed portion 15, are formed on the back face 14 of the lens barrel holding portion 18. Screws 70 for connecting the pressing member 60 to the base member 10 are screwed into the two screw holes 16.

The outer peripheral portion of the recessed portion 15 at the back face 14 of the lens barrel holding portion 18 structures a flat face that is perpendicular to the axis S1 of the through hole 11. The front face of the securing plate 40 makes facial contact with the back face 14 of the lens barrel holding portion 18. Additionally, the securing plate 40 is slid over the back face 14 of the lens barrel holding portion 18 to carry out positioning within the plane that is perpendicular to the optical axis L of the securing plate 40 (the axis S1). When viewed from the direction that is perpendicular to the axis S1, the area of the recessed portion 15 is set so as to be larger than the area of the imaging element 30 in the plan view. Additionally, the securing plate 40 can move within the plane that is perpendicular to the optical axis L (the axis S1) within a range wherein the imaging element 30 that is held on the securing plate 40 does not contact the peripheral edge portion of the recessed portion 15.

The attaching portion 17 is provided with insertion holes 17a into which are inserted screws (not shown) for attaching the imaging device 1000 to the vehicle, or the like.

The leaf spring 50, as illustrated in FIG. 1 and FIG. 2, comprises a ring-shaped portion 51 and two bent leg portions 52 that extend outward from two opposing locations on either side of the center of the ring-shaped portion 51. The ring-shaped portion 51 is fitted into the cylinder portion 21 in a state wherein it contacts the ring-shaped flange portion 25 of the lens barrel 20. The ring-shaped portion 51 is disposed so as to be able to rotate around the lens barrel 20. Given this, with the lens barrel 20 in a state wherein it is held on the lens barrel holding portion 18 of the base member 10, the respective tip end portions of the two bent leg portions 52 are fitted between the pairs of protruding portions 13 of the base member 10. The bent leg portions 52 of the leaf spring 50 elastically deform as the lens barrel 20 is screwed into the through hole 11 of the lens barrel holding portion 18. Accompanying this, the lens barrel 20 is biased in the direction away from the base member 10 along the optical axis L.

The imaging element 30 is structured from a solid-state imaging element such as a CCD sensor, a CMOS sensor, or the like. As illustrated in FIG. 1 and FIG. 4, the imaging element 30 is secured to the securing plate 40 so that the imaging surface 30a is parallel to the front face of the securing plate 40, that is, parallel to the face wherein the back face 14 of the base member 10 and the securing plate 40 make facial contact.

Figure 5:
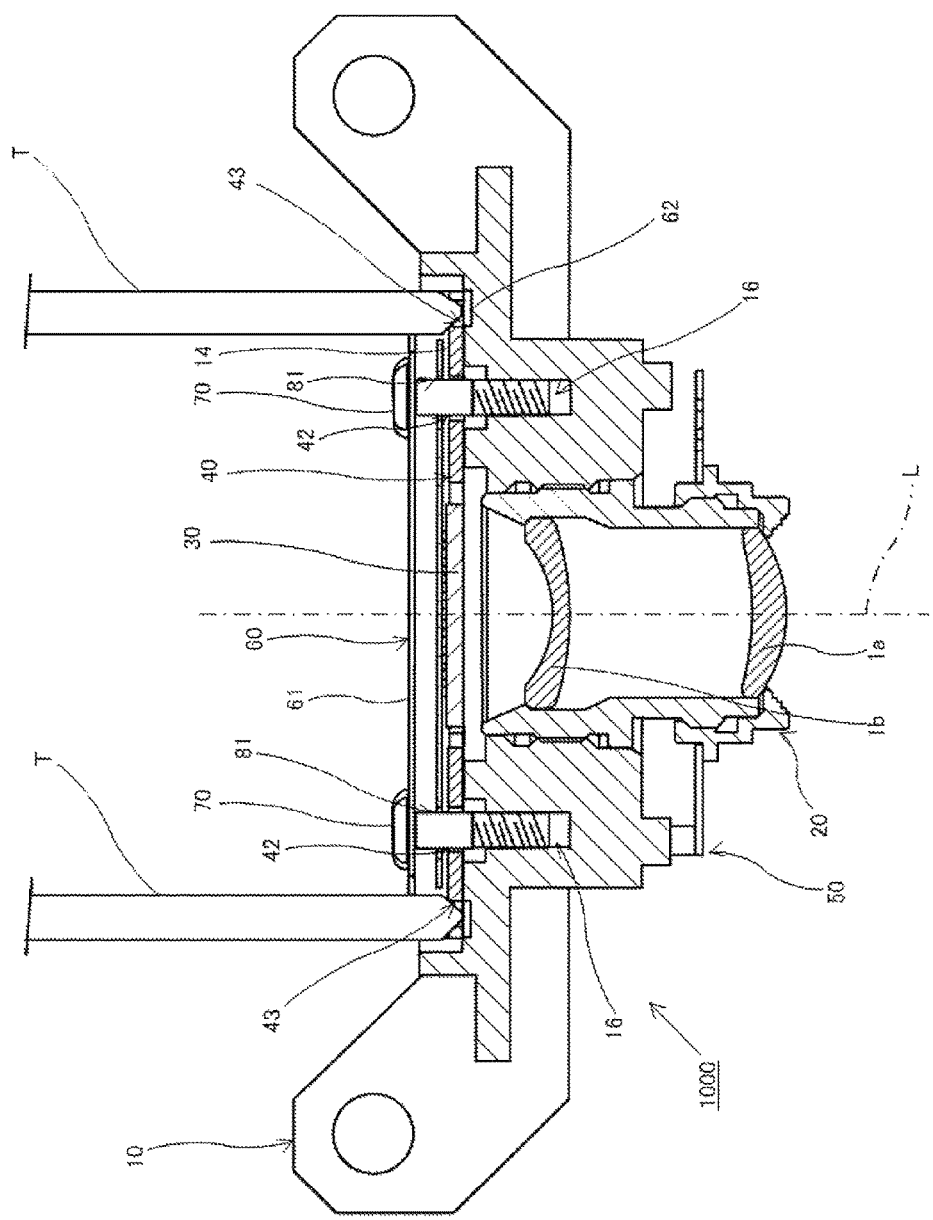
FIG. 5 is a cross-sectional view illustrating the state wherein a centering adjusting pin of the imaging device of the example is attached.
Figure 6:
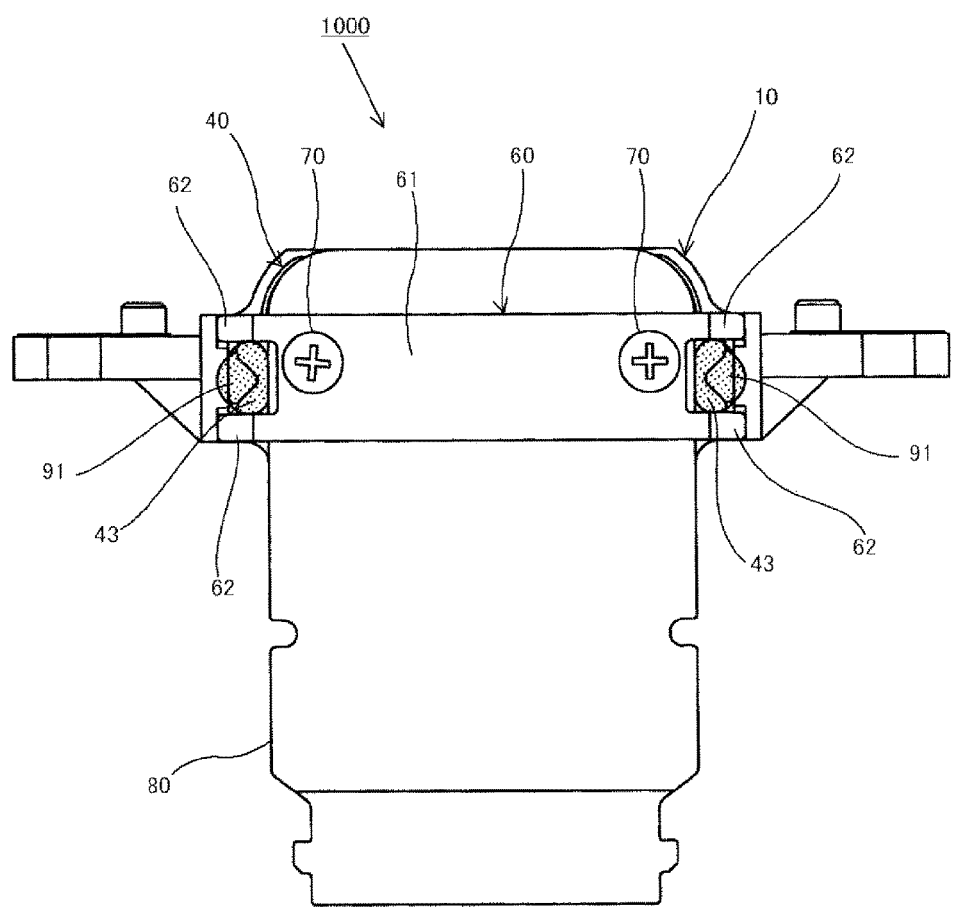
FIG. 6 is a back view of an imaging device according to the example.

The securing plate 40 comprises an essentially rectangular plate-shaped main portion 41, and two chucking portions 43 that extend from both sides of the main portion 41 in the lengthwise direction, and that are chucked by gripping members, such as centering adjusting pins, when adjusting the position of the securing plate 40. The main portion 41 has an opening portion 41a that is essentially rectangular in the plan view, for holding the imaging element 30 therein, and two through holes 42, into which the screws 70 are inserted. The opening portion 41a is slightly larger than the outer dimensions of the imaging element 30. The imaging element 30 is secured to the securing plate 40, through an appropriate adhesive agent, or the like, in a state wherein it is fitted into the opening portion 41a. The inner diameter of the through holes 42 is set so as to be larger than the outer diameter of the shaft portions 71 of the screws 70, and set so as to be smaller than the outer diameter of the head portions 72 of the screws 70. Through this, the shaft portions 71 of the screws 70 are able to move within the through holes 42, enabling the securing plate 40 to move relative to the base member 10. Moreover, the chucking portion 43 has a notch portion (an adhesive agent filling portion) 43a that, in the plan view, has a wedge shape. Additionally, as illustrated in FIG. 5, the securing plate 40 is handled in a state wherein it is held from both sides by a pair of rod-shaped centering adjusting pins T that are inserted into the notch portions 43a of the chucking portions 43. The securing plate 40, as illustrated in FIG. 4 and FIG. 6, is bonded to the base member 10 by the adhesive agent 91 that is filled into the notch portions 43a of the chucking portions 43. An ultraviolet radiation-curable adhesive agent or a naturally dryable adhesive agent may be employed for this adhesive agent 91. Moreover, the chucking portion 43, into which the adhesive agent 91 is filled, having a wedge-shaped notch portion 43a enables the adhesive agent 91 to coat the correct location.

The securing plate 40 is secured to the base member 10 in either a provisionally secured state, wherein it is provisionally secured to the base member 10 through a pressing member 60, or a secured state, wherein it is secured to the base member 10 by the adhesive agent 91. In the provisionally secured state, the securing plate 40 is able to move, relative to the base member 10, in a direction that crosses the optical axis L of the lens group 1. The securing plate securing member is structured so as to attach the securing plate 40 to the base member 10, and includes both the pressing member 60 and the adhesive agent 91.

The circuit board 80 is structured from a sheet-shaped flexible printed circuit board. The imaging element 30 is mounted on the front face of the circuit board 80. An interconnection (not shown) that is connected electrically to the imaging element 30 is formed on the front face of the circuit board 80. The circuit board 80 is disposed on the back surface side of the securing plate 40, in a state wherein the imaging element 30, which is mounted on the front face, is fitted into an opening portion 41a of the securing plate 40. Moreover, the circuit board 80 has through holes 81 that are formed respectively at positions corresponding to the two through holes 42 of the securing plate 40, in the state wherein the circuit board 80 is disposed on the back face side of the securing plate 40, as illustrated in FIG. 2.

In the provisionally secured state wherein the securing plate 40 is secured provisionally to the base member 10, and in the secured state wherein the securing plate 40 is secured to the base member 10, the pressing member 60 presses the securing plate 40 toward the base member 10. The pressing member 60 is formed from a material that can deform elastically, such as an elastically deformable metal plate, or the like. The pressing member 60, as illustrated in FIG. 1, FIG. 2, and FIG. 4, is equipped with a long thin plate-shaped flat plate portion 61, contacting portions 62 for contacting the chucking portions 43 of the securing plate 40, and connecting portions 64 for connecting the flat plate portion 61 and the contacting portions 62. The flat plate portion 61 is disposed away from the securing plate 40 on the side that is opposite of the base member 10 side of the securing plate 40 (the back side) and is secured to the base member 10 through screws 70. The connecting portions 64 extend in the thickness direction of the flat plate portion 61 at two locations, at both ends, in the lengthwise direction, of the flat plate portion 61. The contacting portions 62 extend parallel to the flat plate portion 61 from the tip end portions of each of the connecting portions 64. Two through holes (first through holes) 63, into which screws 70 are inserted, are formed in the flat plate portion 61. The pressing member 60 is disposed parallel to the securing plate 40 in a state wherein the flat plate portion 61 is away from the securing plate 40, and the contacting portions 62 are arranged in a state wherein they make contact with the securing plate 40.

The pressing member 60 is disposed in a state that contacts the securing plate 40 at the back sides of the chucking portions 43 that extend beyond the circuit board 80, overlapping the back side of the securing plate 40. Moreover, in this state, the pressing member 60 is secured, together with the circuit board 80 and the securing plate 40, through screws 70 through tightening into the base member 10. Through this, the pressing member 60 secures the securing plate 40 provisionally in a state wherein the contacting portions 62 press the chucking portions 43 of the securing plate 40 against the back face 14 of the base member 10. Here the securing plate 40 is able to slide along the back face 14 of the base member 10 against the pressing force of the pressing member 60.

As illustrated in FIG. 1, FIG. 2, and FIG. 4, the screw 70 is provided with a shaft portion 71 and a head portion 72. Of the screws 70, the shaft portions 71 that are inserted into the through holes 63 of the pressing member 60, the through holes 81 of the circuit board 80, and the through holes 42 of the securing plate 40, are screwed into the screw holes 16 of the base member 10 in a state wherein the securing plate 40 is in facial contact with the back face 14 of the base member 10 and wherein the contacting portions 62 of the pressing member 60 are in contact with the chucking portion 43 of the securing plate 40. The pressing member 60, the circuit board 80, and the securing plate 40 are connected to the base member 10 in this way. Moreover, the outer diameter of the shaft portion 71 is smaller than the inner diameter of the through holes 42 of the securing plate 40, the inner diameter of the through holes 81 of the circuit board 80, and the inner diameter of the through holes 63 of the pressing member 60. Moreover, the outer diameter of the head portion 72 is larger than the inner diameter of the through holes 42 of the securing plate 40, the inner diameter of the through holes 81 of the circuit board 80, and the inner diameter of the through holes 63 of the pressing member 60. Through this, the securing plate 40 and the circuit board 80 are able to move, relative to the base member 10, through the shaft portions 71 of the screws 70 moving within the through holes 42 of the securing plate 40, within the through holes 81 of the circuit board 80, and within the through holes 63 of the pressing member 60.

Moreover, the screws 70 are inserted into the through holes 42 of the securing plate 40 so as to prevent the securing plate 40 from becoming detached from the base member 10 if the adhesive agent 91 that secures the securing plate 40 to the base member 10 were to become delaminated.

The method for manufacturing the imaging device 1000 according to the present example will be explained next. Here the explanation will be primarily regarding a centering adjusting step for adjusting the optical axis of the lens group 1 using a centering adjusting instrument, and a bonding step for securing the securing plate 40 to the base member 10 through the adhesive agent 91. First the lens barrel 20 wherein a lens group 1 is secured to the inside of the cylinder portion 21, so that the axis S2 of the cylinder portion 21 is coincident with the optical axis L of the lens group 1, and an assembly wherein the circuit board 80, whereon the imaging element 30 is mounted, and the securing plate 40 are combined together in a single unit, are prepared.

Following this, the base member 10 is placed in a centering adjusting instrument (not shown), a ring-shaped portion 51 of the leaf spring 50 is fitted into the cylinder portion 21 of the lens barrel 20, and the tip end portion of the bent leg portion 52 of the leaf spring 50 is fitted between the pair of protruding portions 13 that is provided on the front face 12 of the base member 10. In this state, the male threaded portion 22 of the lens barrel 20 is then screwed a prescribed amount into the female threaded portion 11a of the base member 10.

Following this, the securing plate 40 is placed in a state of facial contact with a portion of the back face 14 of the base member 10, and the contacting portions 62 of the pressing member 60 are caused to contact the chucking portion 43 of the securing plate 40 from the side that is opposite of the base member 10 side of the securing plate 40. In this state, the screws 70 are inserted into the through holes 63 of the pressing member 60, the through holes 81 of the circuit board 80, and the through holes 42 of the securing plate 40, and the shaft portions 71 of the screws 70 are screwed, by a prescribed amount, into the screw holes 16 of the base member 10. In this case, the amount by which the screws 70 are screwed is set so that the pressing force on the securing plate 40 by the pressing member 60 will have a prescribed magnitude. This produces a state wherein the securing plate 40 is secured provisionally to the base member 10 by the pressing member 60.

Thereafter, the focus of the imaging device 1000 is adjusted through screwing the lens barrel 20 in as appropriate, while the captured images that are obtained through the lens group 1 by driving the imaging element 30 are checked. During this focus adjustment, the lens barrel 20 is biased in the direction away from the base member 10 along the optical axis L by the leaf spring 50.

Moreover, when the lens barrel 20 is assembled together with the base member 10, the front guiding portion 23 and the back guiding portion 24 of the lens barrel 20 are guided by the front guiding portion 11b and the back guiding portion 11c of the base member 10. Through this, the axis S2 of the lens barrel 20, that is, the optical axis L of the lens group 1, is caused to be coincident with the axis S1 of the through hole 11 of the base member 10. Consequently, this can prevent the axis S2 of the lens barrel 20, that is, the optical axis L of the lens group 1, from becoming shifted relative to the axis S1 of the through hole 11 of the base member 10, or becoming tilted relative to the axis S1 of the through hole 11.

Figure 7:
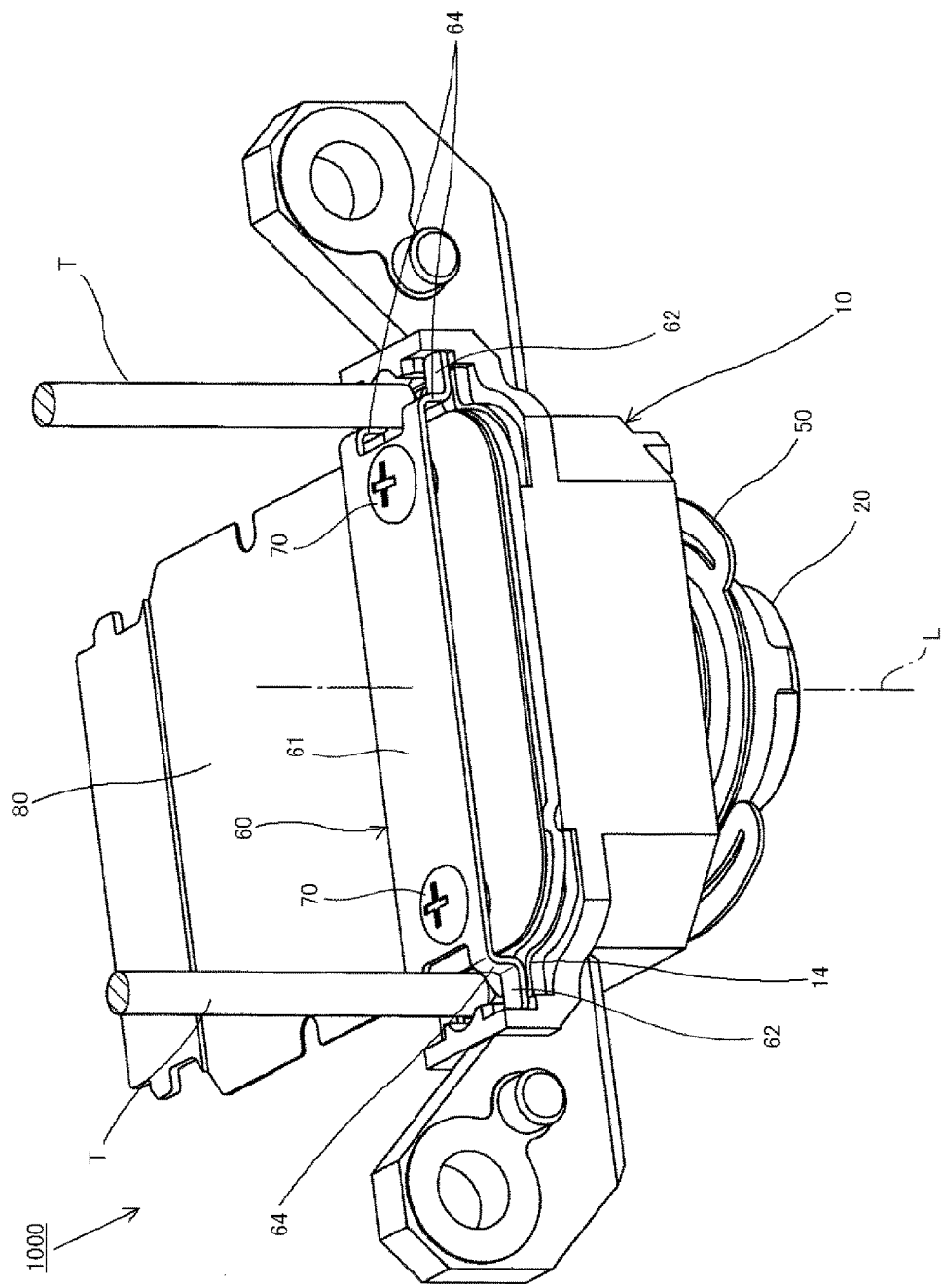
FIG. 7 is a perspective diagram illustrating the state wherein a centering adjusting pin of the imaging device of the example is attached.
Figure 8:
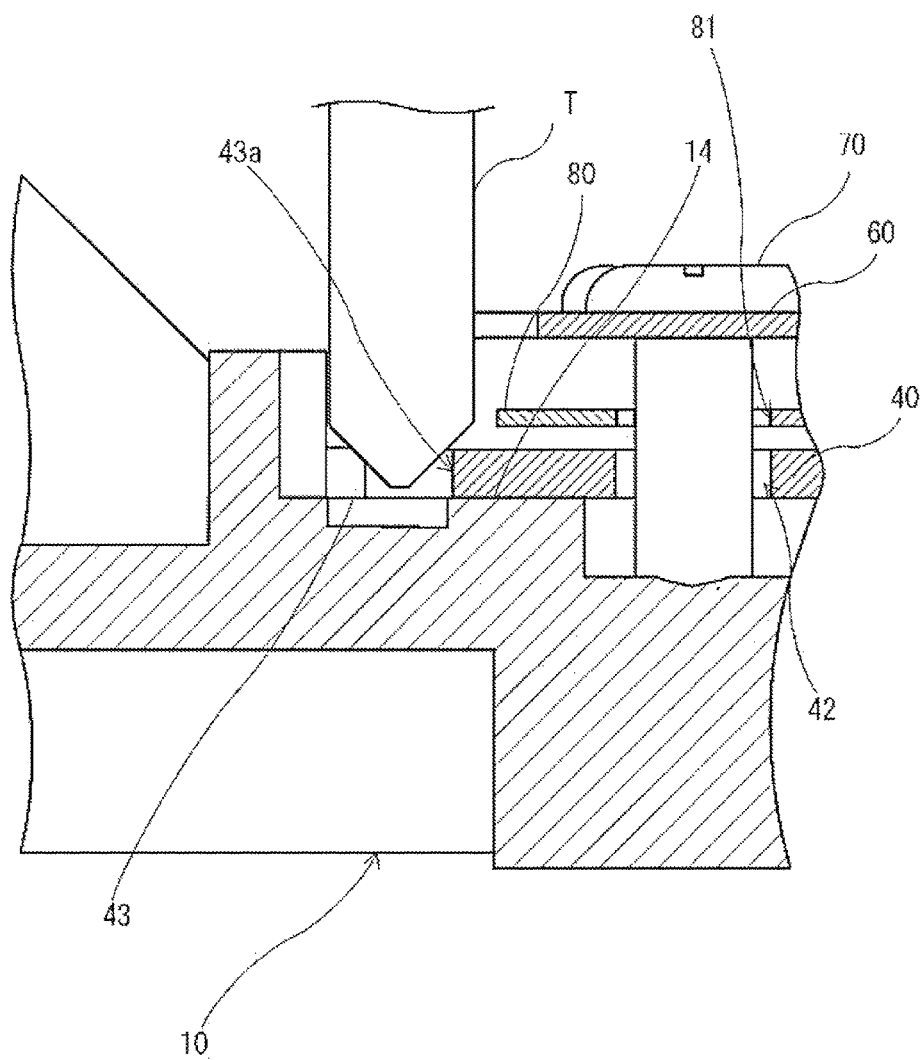
FIG. 8 is a partial enlarged cross-sectional view illustrating the state wherein a centering adjusting pin of the imaging device of the example is attached.
Figure 9:
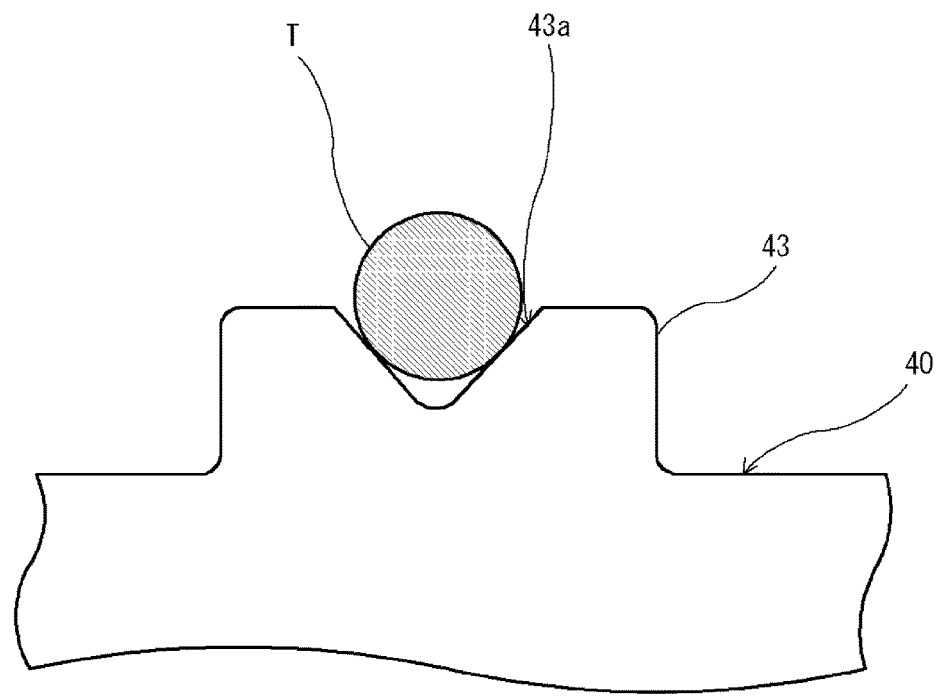
FIG. 9 is a partial enlarged plan view of a chucking portion of a securing plate according to the example.

Following this, as illustrated in FIG. 7, a pair of centering adjusting pins T is fitted, from the side that is opposite of the securing plate 40 side of the pressing member 60, between the pairs of contacting portions 62 that are positioned on each of the end portions, in the lengthwise direction, of the pressing member 60, and fitted into the notch portions 43a of the chucking portions 43 of the securing plate 40. Note that preferably, as illustrated in FIG. 5 and FIG. 8, the tip end portions of the centering adjusting pins T are cone shapes, that is, shapes that narrow toward the tip. In this case, the centering adjusting pins T are disposed in a state that is in contact with the peripheral edge portions of the notch portions 43a of the chucking portions 43, as illustrated in FIG. 9.

Following this, when the centering adjusting pins T are moved along the back face 14 of the base member 10, the securing plate 40 will slide along the back face 14 of the base member 10. In this case, the circuit board 80 that is combined integrally with the securing plate 40 will move together with the securing plate 40, and the imaging element 30 that is mounted on the circuit board 80 will also move together with the securing plate 40. Consequently, the position of the imaging element 30 can be adjusted so that the optical axis L of the lens group 1 will pass through the center of the imaging surface 30a of the imaging element 30, through moving of the centering adjusting pins T along the back face 14 of the base member 10. When adjusting the position of the imaging element 30, there is no need for the securing plate 40 to be held by the centering adjusting instrument, enabling the position of the imaging element 30 to be adjusted that much more easily.

In adjusting the position of the imaging element 30 using the centering adjusting pins T, the positioning of the imaging element 30 in a direction that crosses the optical axis L of the lens group 1 is carried out while using the centering adjusting pins T to press the securing plate 40 against the back face 14 of the base member 10. Using the centering adjusting pins T in this way to have the securing plate 40 be in contact with the back face 14 of the base member 10 reduces the likelihood of a gap occurring between the securing plate 40 and the back face 14 of the base member 10. Note that, in the bonding step, described below, wherein the adhesive agent 91 is filled, if there were a gap between the securing plate 40 and the back face 14 of the base member 10, the adhesive agent 91 would leak out into the gap between the securing plate 40 and the back face 14 of the base member 10. When this is done, there is the possibility that the position of the imaging element 30 will shift due to expansion or contraction of the adhesive agent 91. In contrast, as described above, because the production of a gap between the securing plate 40 and the back face 14 of the base member 10 is prevented through positioning the imaging element 30 while the securing plate 40 is in contact with the back face 14 of the base member 10, this prevents the adhesive agent 91 from leaking between the securing plate 40 and the base member 10, thus making it possible to prevent a negative effect on the resolution of the images and videos captured by the imaging device 1000.

Thereafter, the centering adjusting pins T are removed from the notch portions 43a of the chucking portion 43 of the securing plate 40, and, as illustrated in FIG. 4 and FIG. 6, an adhesive agent 91 is coated onto the notch portions 43a of the chucking portions 43 of the securing plate 40 from which the centering adjusting pins T have been removed. The securing plate 40 is secured to the base member 10 thereby.

An adhesive agent (not shown) is then coated between the base member 10 and the outer peripheral surface of the cylinder portion 21 of the lens barrel 20. The lens barrel 20 is secured to the base member 10 thereby.

In this way, in the method for manufacturing an imaging device 1000 according to the present invention, a centering adjusting step is carried out in a state wherein the securing plate 40 is secured provisionally by the pressing member 60 to the base member 10. Through this, there will be no shifting of the position of the securing plate 40 relative to the base member 10 even when the imaging device 1000 is removed from the centering adjusting instrument after the centering adjusting step. Moreover, the bonding step is carried out in a state wherein the imaging device 1000 is removed from the centering adjusting instrument.

As explained above, the imaging device 1000 according to the present example comprises a lens barrel 20 for holding the lens group 1, a securing plate 40 for securing the imaging element 30, a base member 10, and a pressing member 60. The imaging element 30 is secured to the securing plate 40 so that the imaging surface 30*a* of the imaging element 30 will be essentially parallel to the front face of the securing plate 40. Given this, the base member 10 holds the lens barrel 20 in a state wherein the position can be adjusted in the direction of the optical axis L of the lens group 1 of the lens barrel 20. The position of the securing plate 40 can be adjusted within the plane that is perpendicular to the optical axis L of the lens group 1 in a state wherein it is secured provisionally to the base member 10 in a state wherein it is pressed against the base member 10 by the pressing member 60.

Through this, the focus of the lens group 1 is adjusted through adjusting the position of the lens barrel 20, relative to the base member 10, in the direction of the optical axis L of the lens group 1. Moreover, the securing plate 40 can move within the plane that is perpendicular to the optical axis L of the lens group 1 in a state wherein it is secured provisionally to the base member 10. Given this, for the alignment of the optical axis of the lens group 1, the orientation of the securing plate 40 can be adjusted within the plane that is perpendicular to the optical axis L of the lens group 1, that is, in a direction that crosses the optical axis L, and in the direction of rotation around the optical axis L.

Here, in the imaging device described in JP '369, for example, it was necessary to bond the base member to the circuit board while maintaining a state wherein the base member was held in the centering adjusting instrument. Because of this, the centering adjusting step and the bonding step could not be carried out in parallel, making it difficult to achieve improvements in manufacturability of imaging devices.

In contrast, in the imaging device 1000 according to the present example, the securing plate 40 is provisionally secured by the pressing member 60 to the base member 10 in a state wherein positional adjustment is possible within a plane that is perpendicular to the optical axis L of the lens group 1. Consequently, in the centering adjusting step wherein adjustments to the optical axis of the imaging device 1000 are carried out using, for example, a centering adjusting instrument, there is no need to hold the securing plate 40 by the centering adjusting, or the like, enabling the adjustment of the optical axis of the lens group, including aligning the optical axis of the lens group 1 and adjusting the focus of the lens group, to be carried out easily. Moreover, even if the imaging device 1000 is removed from the centering adjusting instrument after the centering adjusting step for adjusting the optical axis of the imaging device 1000 is carried out, the securing plate 40 is secured provisionally to the base member 10 by the pressing member 60, enabling the bonding step, for securing the securing plate 40 to the base member 10 using the adhesive agent 91, for example, to be carried out in a state wherein the imaging device 1000 has been removed from the centering adjusting instrument, enabling the operations in the bonding step to be carried out easily. Moreover, because there is no need to use the centering adjusting instrument in the bonding step, the centering adjusting instrument need only be used in the centering adjusting step alone, making it possible to improve the throughput of the centering adjusting step. In this way, the operations in the centering adjusting step and in the bonding step can be carried out easily and the throughput in the centering adjusting step can be improved, enabling an improvement in the manufacturability in the manufacturing process for the imaging device 1000 as a whole.

Additionally, the improvement in manufacturability in the manufacturing process as a whole for the imaging device 1000 enables a reduction in cost of the imaging device 1000. In this way, the imaging device 1000 has the benefits in securing the desired optical characteristics and in the ability to improve manufacturability.

Moreover, the imaging device 1000 according to the present example is equipped with screws 70 for securing the pressing member 60 to the base member 10. In addition, the pressing member 60 is formed from an elastically deformable material, and is disposed away from the securing plate 40 on the back side of the securing plate 40, and comprises: a plate-shaped flat plate portion 61 that is secured to the base member 10 by the screws 70; contacting portions 62 that contact the chucking portions 43 of the securing plate 40; and connecting portions 64 that connect the flat plate portion 61 and the contacting portions 62.

Through this, when the flat plate portion 61 of the pressing member 60 is secured by the screws 70 to the base member 10, the securing plate 40 is pressed to the base member 10 side in a state wherein the contacting portions 62 of the pressing member 60 contact the chucking portions 43 of the securing plate 40. Given this, through the formation of the pressing member 60 from a material that can be elastically deformed, the securing plate 40 is provisionally secured to the base member 10 in a state wherein positional adjustment is possible within a plane that is perpendicular to the optical axis L of the lens group 1. In this way, the pressing member 60 can be achieved through a simple structure.

Moreover, the base member 10 according to the present example has screw holes 16, where the flat plate portion 61 of the pressing member 60 has through holes 63. Moreover, the screws 70 are screwed into the screw holes 16 of the base member 10 in a state wherein they are inserted into the through holes 63. The contacting portions 62 of the pressing member 60 are biased in the direction toward the base member 10 by a biasing force that depends on the amount to which the screws 70 are screwed into the screw holes 16.

Because the pressing member 60 is secured to the base member 10 by the screws 70 in this way, the force with which the securing plate 40 is pressed toward the base member 10 by the pressing member 60 can be adjusted easily by merely adjusting appropriately the amounts by which the screws 70 are screwed in. That is, the pressing force with which the securing plate 40 is pressed can be set easily to the optimal force for enabling the provisional securing of the securing plate 40 while allowing the securing plate 40 to move relative to the base member 10.

Moreover, the imaging device 1000 according to the present example is equipped with a leaf spring 50 for biasing the lens barrel 20 in the direction of the optical axis L of the lens group 1. The lens barrel 20 is formed a male threaded portion 22 on the outer peripheral surface thereof. The base member 10 has a through hole 11 that passes through the base member 10 and into which the lens barrel 20 is inserted, where a female threaded portion 11a, for screwing together with the male threaded portion 22 of the lens barrel 20, is formed on the inner peripheral surface of the through hole 11.

Here, in the imaging device set forth in JP '369, described above, when the adjustment of the position of the lens barrel is carried out in a state wherein the male threaded portion of the lens barrel is screwed together with the female threaded portion of the base member, there were concerns that the position of the lens barrel could shift in the bonding step, following the centering adjusting step, due to backlash or gaps caused by manufacturing errors in the dimensions between the male threaded portion and the female threaded portion.

In contrast, in the imaging device 1000 according to the present example, play in the lens barrel 20, which would be caused by backlash, or the like, that exists between the male threaded portion 22 and the female threaded portion 11a when performing the adjustment to the position of the lens barrel 20 in the direction of the optical axis L can be prevented through the lens barrel 20 being biased by the leaf spring 50 in the direction of the optical axis L of the lens group 1, as described above. Given this, the positioning of the lens barrel 20 can be carried out with good accuracy, through preventing the play in the lens barrel 20 that would be caused by backlash, and the like, that exists between the male threaded portion 22 and the female threaded portion 11a. Moreover, when securing the lens barrel 20 to the base member 10, the adhesive agent is filled between the lens barrel 20 and the base member 10 in a state wherein the lens barrel 20 is biased by the leaf spring 50 in the direction of the optical axis L. This makes it possible to prevent misalignment of the lens barrel 20 in relation to the base member 10 when filling the adhesive agent between the lens barrel 20 and the base member 10.

Moreover, the ring-shaped portion 51 of the leaf spring 50 is disposed so as to be able to rotate around the lens barrel 20, and, as a result, no twisting force is produced on the leaf spring 50 when the lens barrel 20 is screwed into the through hole 11 of the base member 10. As a result, enables prevention of the occurrence of a problem with the positioning of the lens barrel 20 that could result from the twisting force of the leaf spring 50, enabling the focus of the imaging device 1000 to be adjusted accurately.

Additionally, the base member 10 according to the present example has a front guiding portion 11b and a back guiding portion 11c for guiding the lens barrel 20 so that the axis S2 of the lens barrel 20 will be coincident with the axis S1 of the through hole 11. Moreover, the lens barrel 20 has a front guiding portion 23 and a back guiding portion 24 for guiding the front guiding portion 11b and the back guiding portion 11c.

Through this, when the lens barrel 20, to which the lens group 1 is secured in advance in such a way that the optical axis L of the lens group 1 is coincident with the axis S2 of the lens barrel 20, is attached to the base member 10, the front guiding portion 23 and the back guiding portion 24 of the lens barrel 20 are guided by the front guiding portion 11b and the back guiding portion 11c of the base member 10. Given this, the lens barrel 20 is disposed in a position so that the axis S2 of the lens barrel 20, that is, the optical axis L of the lens group 1, will be coincident with the axis S1 of the through hole 11 of the base member 10. Consequently, this can prevent the axis S2 of the lens barrel 20, that is, the optical axis L of the lens group 1, from becoming shifted or tilted relative to the axis S1 of the through hole 11 of the base member 10.

Moreover, the front guiding portion 11b and the back guiding portion 11c in the present example are formed on both sides of the female threaded portion 11a on the inner peripheral surface of the through hole 11 of the base member 10. Moreover, front guiding portions 23 and back guiding portions 24 are formed on both sides of the male threaded portion 22 on the outer peripheral surface of the lens barrel 20.

Through this, this enables prevention of shifting or tilting of the optical axis L of the lens group 1, relative to the axis S1 of the through hole 11 of the base member 10, more reliably than in a structure wherein, for example, a guiding portion and a guided portion are provided one each.

Moreover, the front guiding portions 11b and back guiding portions 11c in the present example are formed so as to make contact with the front guiding portions 23 and the back guiding portions 24 around the entire periphery. This enables prevention of shifting or tilting of the optical axis L of the lens group 1 relative to the axis S1 of the through hole 11 of the base member 10.

Moreover, the imaging device 1000 according to the present example is equipped with a leaf spring 50. This leaf spring 50 biases the lens barrel 20 in the direction away from the base member 10 along the optical axis L. Play in the lens barrel 20 wherein adjusting the focus of the imaging device 1000 is prevented thereby, increasing the accuracy with which the lens barrel 20 is positioned. Moreover, in a state wherein the lens barrel 20 is biased by the leaf spring 50 in the direction away from the base member 10 along the optical axis L, it is secured to the base member 10 by an adhesive agent. This is able to prevent shift in the position of the lens barrel 20 when the lens barrel 20 is attached to the base member 10.

Moreover, the imaging device 1000 according to the present example has an adhesive agent 91 provided interposed between the securing plate 40 and the base member 10. Additionally, the securing plate 40 is secured to the base member 10 by an adhesive agent 91. This enables a reduction in the external noises that act on the securing plate 40 when the securing plate 40 is secured to the base member 10, when compared to a structure wherein, for example, the securing plate 40 is secured to the base member 10 through the use of screws, or the like, enabling prevention of misalignment of the securing plate 40 when the securing plate 40 is secured to the base member 10.

Moreover, notch portions 43a (adhesive agent filling portions) that have wedge shapes in the plan view, for filling with the adhesive agent 91, are provided in the chucking portions 43 of the securing plate 40 according to the present example. Through this, the adhesive agent can be filled in an appropriate position when the adhesive agent is filled between the securing plate 40 and the base member 10.

Moreover, in the centering adjusting step in the imaging device 1000 according to the present example, the position of the securing plate 40 can be adjusted in a state wherein the tip end portions of the centering adjusting pins T are inserted into the notch portions 43a of the chucking portions 43 of the securing plate 40, as described above. In this case, insertion of the tip end portions of the centering adjusting pins T is facilitated through the notch portions 43a being formed in what, in the plan view, are ridge shapes. The adjustment of the position of the securing plate 40 using the centering adjusting pins T is facilitated through facilitating, in this way, the insertion of the tip end portions of the centering adjusting pins T into the notch portions 43a.

Example 2

Figure 10:
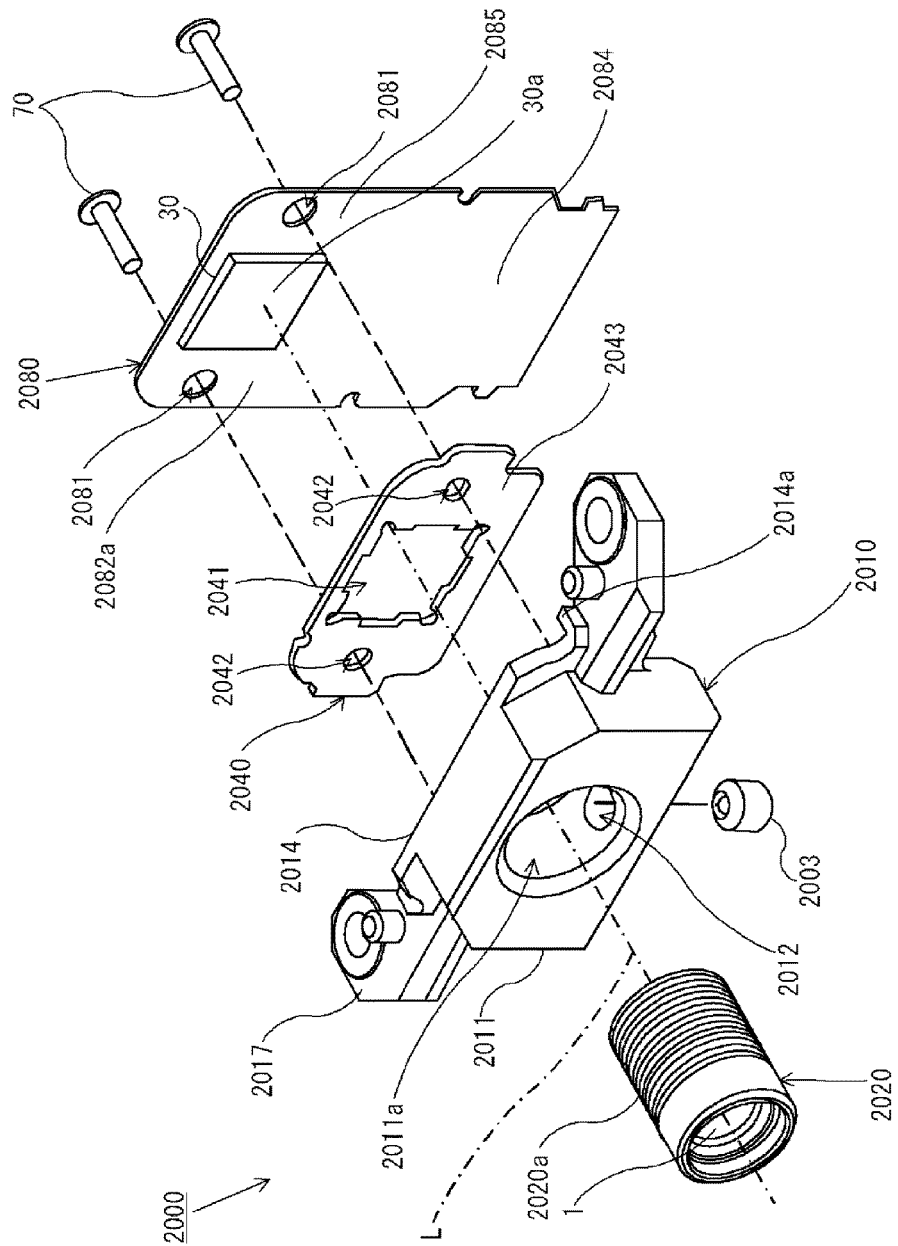
FIG. 10 is an assembly perspective diagram of an imaging device according to another example according to the present invention.
Figure 11:
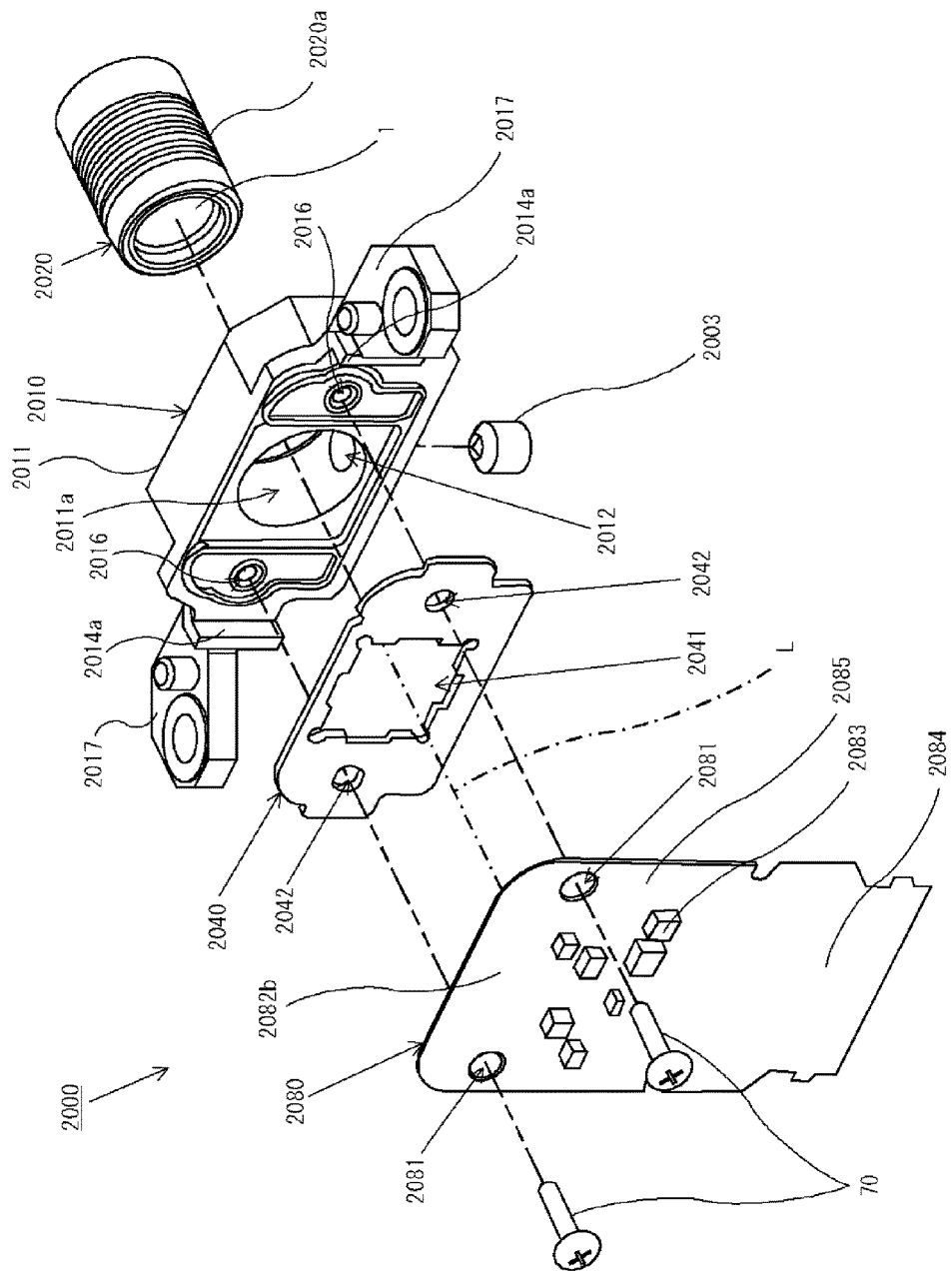
FIG. 11 is an assembly perspective diagram of an imaging device according to the other example.
Figure 12:
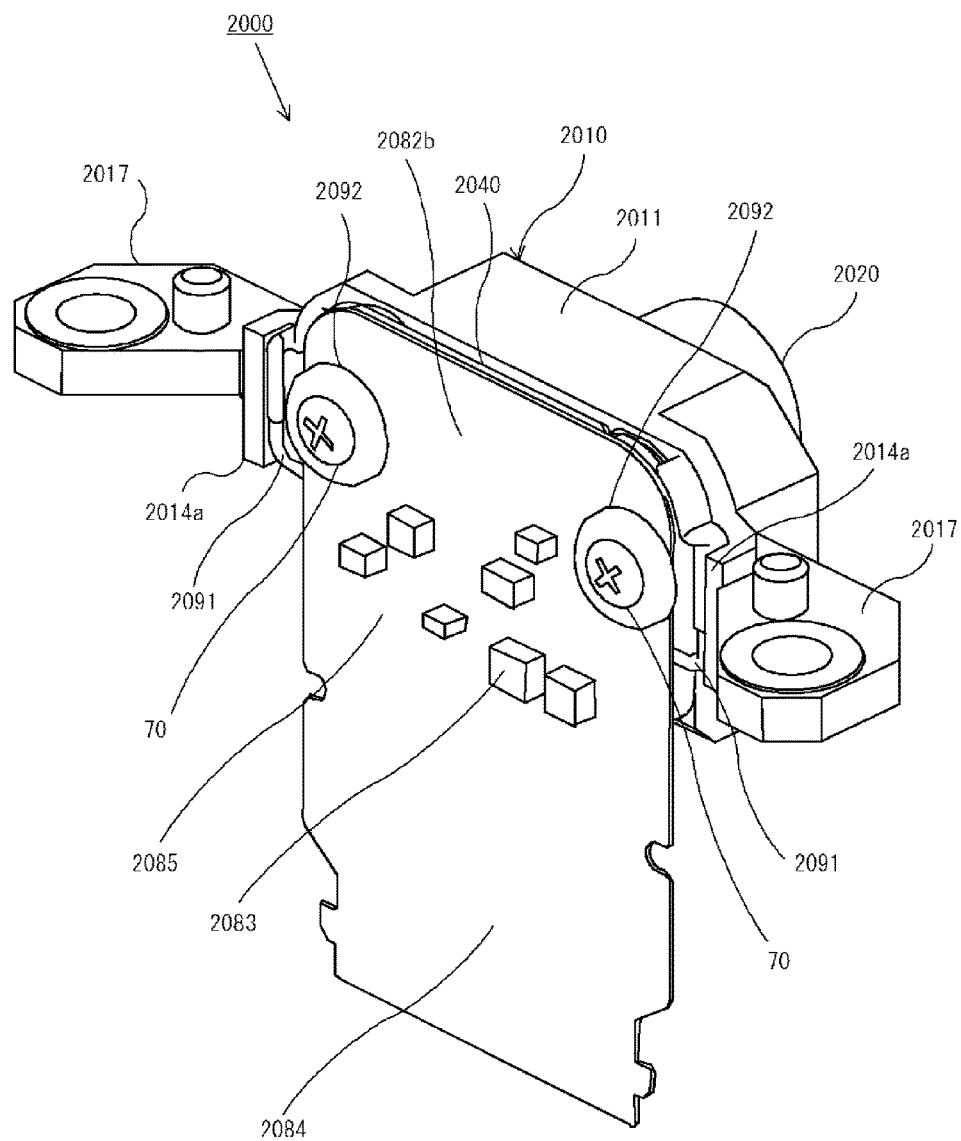
FIG. 12 is a perspective diagram of an imaging device according to the other example.
Figure 13:
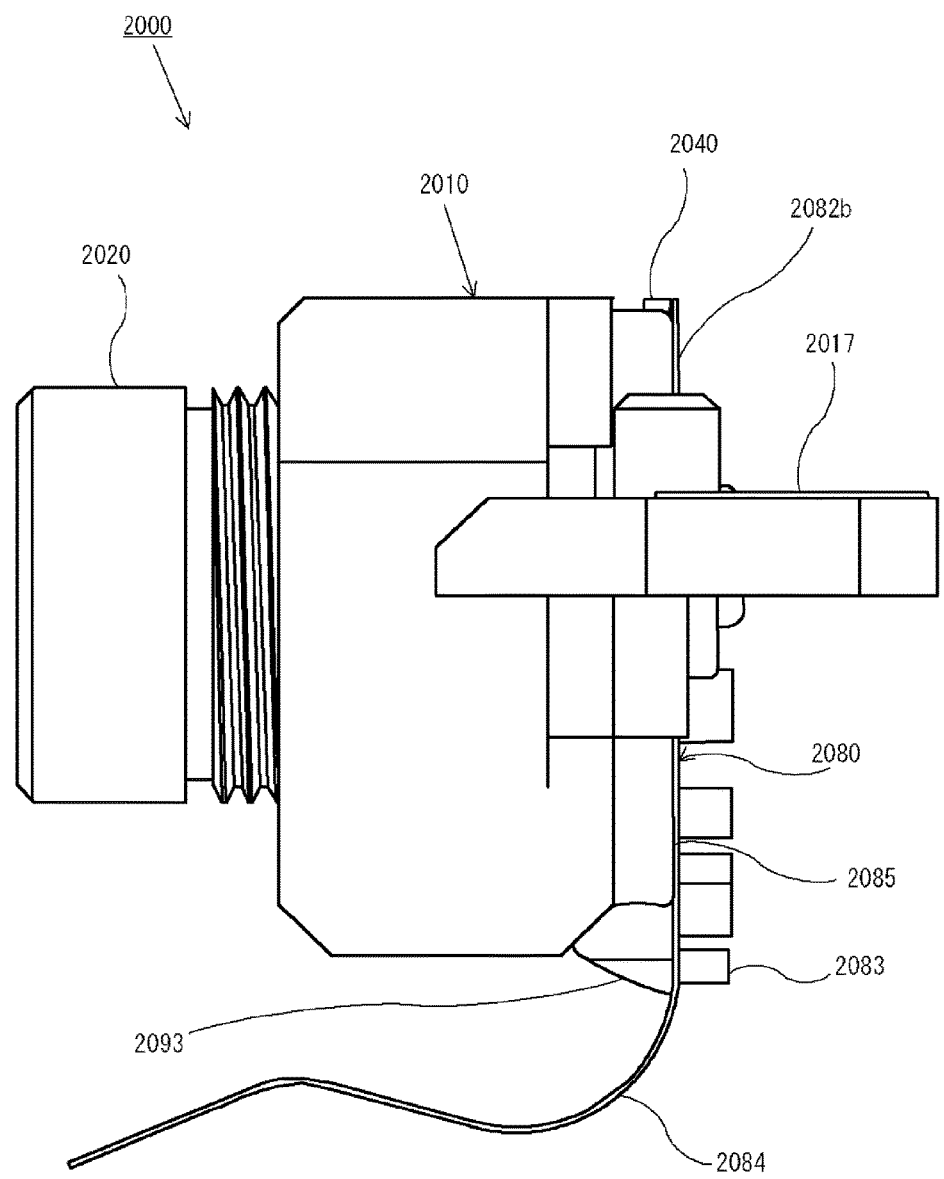
FIG. 13 is a side view of an imaging device according to the other example.

The imaging device according to the present example is attached to a vehicle, or the like. Here "vehicle" refers to, for example, a vehicle for transporting passengers or cargo, such as a train or an automobile. As illustrated in FIG. 10 and FIG. 11, the imaging device 2000 according to the present example comprises a lens barrel 2020, a base member 2010, an imaging element 30, a circuit board 2080, a securing plate 2040, and screws 70. As appropriate, in the below, the explanations in FIG. 10 and FIG. 11 will define the direction toward the circuit board 2080 along the optical axis L of the lens group 1 as toward the "back," and the opposite direction along the optical axis L as toward the "front." Moreover, the imaging device 2000, as illustrated in FIG. 12 and FIG. 13, comprises adhesive agents 2091, 2092, and 2093, that are interposed between the base member 2010 and the securing plate 2040, and that function as securing plate securing members for attaching the securing plate 2040 to the base member 2010. Note that structures that are identical to those in the previous example are assigned reference symbols that are the same as those in FIG. 1.

The lens barrel 2020 is formed from a resin material, or the like, into a cylinder, and the lens group 1 is held therein. A male threaded portion 2020a, for securing the lens barrel 2020 to the base member 2010, is formed on the outer peripheral surface of the lens barrel 2020.

The base member 2010 holds the lens barrel 2020 in a state wherein the lens barrel 2020 is secured by a locking screw 2003. The base member 2010 comprises a lens barrel holding portion 2011 for holding the lens barrel 2020, and two attaching portions 2017 for attaching the base member 2010 to a vehicle, or the like. This base member 2010 is formed from a resin material, or the like.

The lens barrel holding portion 2011 is provided with a through hole 2011a into which the lens barrel 2020 is inserted, and a through hole 2012 that extends in a direction that is essentially perpendicular to the axis of the through hole 2011a. A female threaded portion (not shown), for screwing together with the male threaded portion 2020a of the lens barrel 2020, is formed in the through hole 2011a. Female threads (not shown) for screwing together with the locking screw 2003 are formed on the inner peripheral surface of the through hole 2012. In the through hole 2011a, the axis thereof is essentially coaxial with the optical axis L. The base member 2010 holds the lens barrel 2020 in a state wherein the tip end portion of the locking screw 2003 that is inserted into the through hole 2012 makes pressing contact against the outer peripheral side face of the lens barrel 2020 that is screwed into the through hole 2011a. The back face 2014 of the base member 2010 is provided with a sidewall portion 2014a that protrudes from the peripheral portion thereof to the securing plate 2040 side. An adhesive agent is filled into a region between this sidewall portion 2014a, the back face 2014 of the base member 2010, and the front face 2043 of the securing plate 2040. There are two screw holes 2016 in the back face 2014 of the base member 2010. Screws 70 are screwed into the screw holes 2016.

The circuit board 2080 is structured from a sheet-shaped flexible printed circuit board. A circuit board 2080 has the imaging element 30 mounted on one surface side thereof, and electronic components 2083 (first electronic components), such as IC chips, resistors, capacitors, and the like, mounted on the other surface side thereof, where the one surface side whereon the imaging element 30 is mounted faces the base member 2010. The circuit board 2080 has, in the direction of the optical axis L of the lens group 1, a facing portion 2085 that faces the base member 2010, and an extending portion 2084 that extends from the facing portion 2085. Two through holes 2081, into which screws 70 are inserted, are provided in the facing portion 2085. An interconnection (not shown) that is connected to the imaging element 30 is provided at a forward region 2082a of the surface side on which the imaging element 30 is mounted in the facing portion 2085. Moreover, an interconnection (not shown) that is connected to the electronic component 2083 is provided at a rearward region 2082b of the surface side on which the electronic component 2083 is mounted on the facing portion 2085. Both of the through holes 2081 have inner diameters that are larger than the outer diameters of the shaft portions of the screws 70. The extending portion 2084 corresponds to the part that is connected to the connector on the vehicle side when the imaging device 2000 is attached to the vehicle.

The securing plate 2040 has two through holes 2042 (third through holes) through which the screws 70 pass, at positions corresponding to the screws 70 that are screwed into the base member 2010. Moreover, an essentially rectangular opening portion 2041 that is slightly larger than the external dimension of the imaging element 30, in the plan view, is provided in the securing plate 2040. The securing plate 2040 is made from metal, or the like. Both of the through holes 2042 have inner diameters that are larger than the outer diameters of the shaft portions of the screws 70. The imaging element 30 is secured to the securing plate 2040 through an adhesive agent (not shown) that is filled between the outer edge thereof and the inner edge of the opening portion 2041 of the securing plate 2040.

In a state wherein the screws 70 protrude to the imaging element 30 side of the base member 2010, they are screwed into the base member 2010. Each screw 70 is provided with a shaft portion wherein threads are cut, and a head portion that has an outer diameter that is larger than the outer diameter of the shaft portion. The outer diameter of the shaft portions of the screws 70 is smaller than the inner diameter of the through holes 2042 of the securing plate 2040 and the inner diameter of the through holes 2081 of the circuit board 2080. The outer diameter of the head portions of the screws 70 is greater than the inner diameter of the through holes 2042 of the securing plate 2040 and the inner diameter of the through holes 2081 of the circuit board 2080. The screws 70 are to prevent the securing plate 2040 and the circuit board 2080 from becoming detached from the base member 2010.

Moreover, in a state wherein the tip end portions of the shaft portions of the screws 70 that are screwed into the screw holes 2016 of the base member 2010 are in contact with the bottoms of the screw holes 2016, the screws 70 ensure a uniform gap between the back face 2014 of the base member 2010 and the front face 2043 of the securing plate 2040, and between the circuit board 2080 and the head portions of the screws 70. Here the securing plate 2040 is formed with dimensions to produce the prescribed gap between the circuit board 2080, which is disposed on the back face thereof, and the head portions of the screws 70.

The adhesive agent 2091, as illustrated in FIG. 12, is interposed between the base member 2010 and the securing plate 2040, to secure them both in a non-contact state. The adhesive agent 2091 is filled between the sidewall portion 2014a of the base member 2010 and the peripheral edge of the securing plate 2040, in a state wherein the securing plate 2040 is facing the back face 2014 of the base member 2010, without making contact, with a prescribed gap therebetween. Here the adhesive agent 2091 may be filled between the base member 2010 and the securing plate 2040 after they have been disposed facing each other at the time of manufacturing of the imaging device 2000, or may be coated onto the back face 2014 of the base member 2010, or onto the peripheral edge of the securing plate 2040, prior to the base member 2010 being disposed facing the securing plate 2040.

A portion of the adhesive agent 2092 is interposed between the screws 70 and the inner edges of the through holes 2042 of the securing plate 2040. Moreover, the position in the adhesive agent 2092 that is positioned on the back surface side of the circuit board 2080 is interposed between the head portion of the screw 70 and the circuit board 2080. The adhesive agent 2092 is filled or coated between the screw 70 and the inner edge of the through hole 2042 of the securing plate 2040 (referencing FIG. 11) and between the head portion of the screw 70 and the rearward region 2082b of the circuit board 2080, in a state wherein the screws 70 are screwed into the screw holes 2016 of the base member 2010 (referencing FIG. 11). In this case, the state will be one wherein the back face 2014 of the base member 2010 is away from the front face 2043 of the securing plate 2040, a state wherein the securing plate 2040 is away from the circuit board 2080.

An adhesive agent 2093, as illustrated in FIG. 13, is interposed between the outer edge portion of the base member 2010 and the extending portion 2084 of the circuit board 2080. The adhesive agent 2093 is provided along the outer edge of the base member 2010 in the forward region 2082a of the circuit board 2080. If the adhesive agent 2093, for example, were not provided here, then there would be a concern that when the extending portion 2084 of the circuit board 2080 is flexed in order to attach the imaging device 2000 to the vehicle, the circuit board 2080 could be bent from the part corresponding to the outer edge portion of the base member 2010. In this regard, in the imaging device 2000 according to the present example, the interposition of the adhesive agent 2093 between the outer edge portion of the base member 2010 and the extending portion 2084 of the circuit board 2080 reduces the degree of bending at the position of contact of the circuit board 2080 with the adhesive agent 2093 when the extending portion 2084 of the circuit board 2080 is flexed. Consequently, this is able to prevent damage to the electronic components 2083 that are provided at the positions corresponding to the adhesive agent 2093 in the rearward region 2082b of the circuit board 2080, and to the interconnections that are connected thereto, when the extending portion 2084 of the circuit board 2080 is flexed.

The adhesive agents 2091, 2092, and 2093 attach the securing plate 2040 to the base member 2010 in either the provisionally secured state, wherein the securing plate 2040 is secured provisionally to the base member 2010, or the secured state, wherein the securing plate 2040 is secured to the base member 2010. Here, in the provisionally secured state, the state is one wherein the securing plate 2040 can move, relative to the base member 2010, in a direction that crosses the optical axis L of the lens group 1. Moreover, in the provisionally secured state, the adhesive agents 2091, 2092, and 2093 are in a fluid state, in the secured state they are in a cured state. The adhesive agents 2091, 2092, and 2093 are structured from adhesive agents that are converted, through exposure to ultraviolet radiation, for example from a state that has fluidity to a state that is hard.

The method for manufacturing the imaging device 2000 according to the present example will be explained next. First, as illustrated in FIG. 10 and FIG. 11, the circuit board 2080 and the securing plate 2040 are disposed facing each other with a prescribed gap (in a non-contact state) to the rear of the base member 2010 that holds the lens barrel 2020. In this case, the circuit board 2080 and the securing plate 2040 are maintained with space by a prescribed holding mechanism. Following this, the shaft portions of the screws 70 are inserted into the through holes 2042 of the securing plate 2040 and into the through holes 2081 of the circuit board 2080, from the rear of the circuit board 2080.

Following this, the tip end portions of the shaft portions of the screws 70 are screwed into the screw holes 2016 of the base member 2010. In this case, the securing plate 2040 and the circuit board 2080 are held in a non-contact state.

Thereafter, the adhesive agent 2091 is filled between the sidewall portion 2014a of the back surface side of the base member 2010 and the outer edge portion of the securing plate 2040. Here the adhesive agent 2091 may be coated instead in advance onto the back face 2014 of the base member 2010 or onto the outer edge portion of the securing plate 2040.

Following this, the adhesive agent 2092 is filled between the screws 70, the securing plate 2040, and the circuit board 2080, and the adhesive agent 2093 is filled between the base member 2010 and the circuit board 2080. At this time, the adhesive agents 2091, 2092, and 2093 are in a fluid state, to produce the provisionally secured state wherein the securing plate 2040 can move, relative to the base member 2010, in a direction that crosses the optical axis L of the lens group 1.

Following this, a prescribed optical axis adjusting apparatus (not shown) is used to adjust the optical axial position (to adjust the position in the direction of the optical axis L, the position in the direction perpendicular to the optical axis L, and the slope relative to the optical axis L), after which the adhesive agents 2091, 2092, and 2093 are exposed to ultraviolet radiation to cure the adhesive agents 2091, 2092, and 2093. At this time, a secured state is produced, wherein the securing plate 2040 is secured to the base member 2010. Doing so completes the imaging device 2000.

As explained above, given the imaging device 2000 according to the present example, the adhesive agent 2091 that is interposed between the base member 2010 and the securing plate 2040, and the adhesive agent 2092 that is interposed between the head portions of the screws 70 and the circuit board 2080, are cured after setting of the optical axis of the imaging element 30. This enables the adjustment of the optical axis of the lens group 1 to be carried out easily and with good accuracy. Moreover, detachment of the securing plate 2040 and the imaging element 30, from the base member 10, even if, for example, the adhesive agent 2091 between the base member 2010 and the securing plate 2040 were to come off due to a physical shock from the outside, is prevented by the adhesive agent 2092 that is interposed between the head portions of the screws 70, the screws 70, and the securing plate 2040.

Moreover, in the imaging device 2000 according to the present example, an adhesive agent 2093 is provided interposed between the base member 2010 and the circuit board 2080. This is able to prevent damage to the electronic components 2083 that are provided at the position that corresponds to the adhesive agent 2093 in the rearward region 2082b of the circuit board 2080, and to the interconnections that are connected thereto, when the extending portion 2084 of the circuit board 2080 is flexed when installing the imaging device 2000 onto a vehicle, or the like.

Example 3

Figure 14:
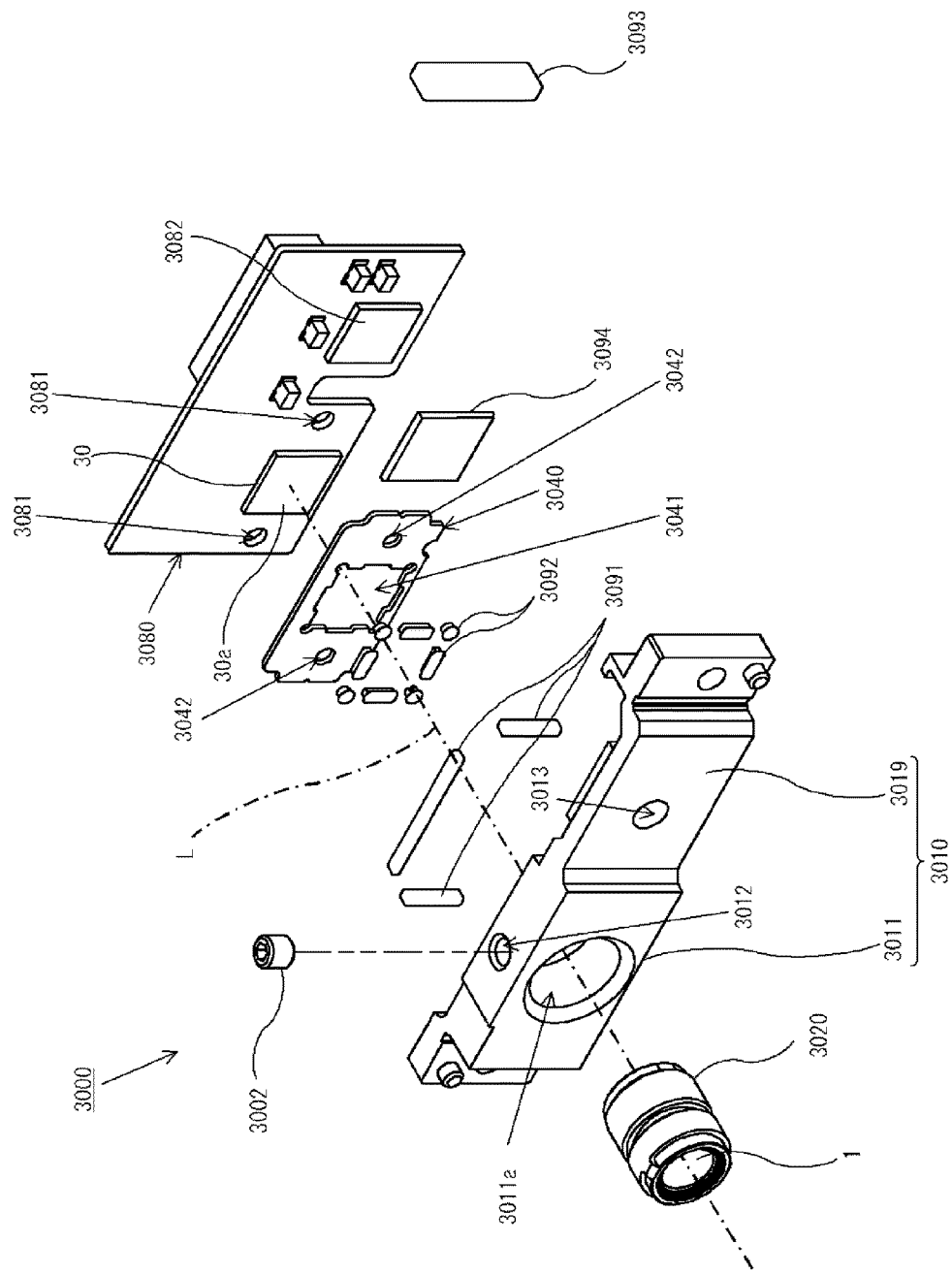
FIG. 14 is an assembly perspective diagram of an imaging device according to a further example according to the present invention.
Figure 15A:
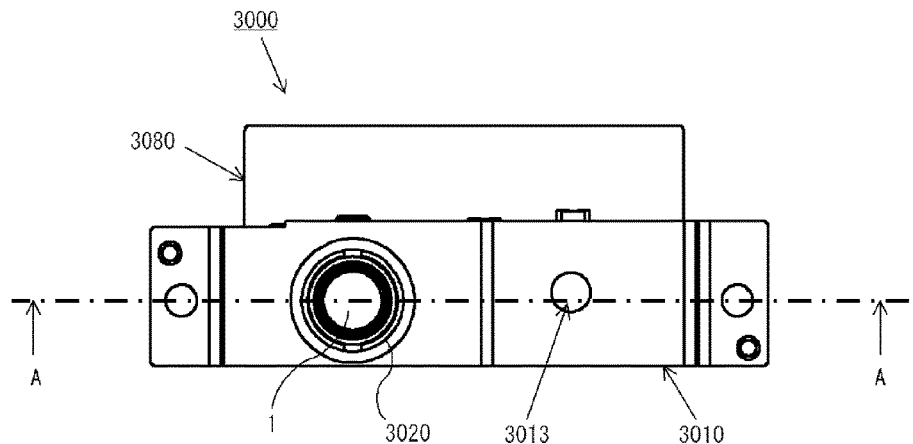
FIG. 15A is a front view of an imaging device according to the further example.
Figure 15B:
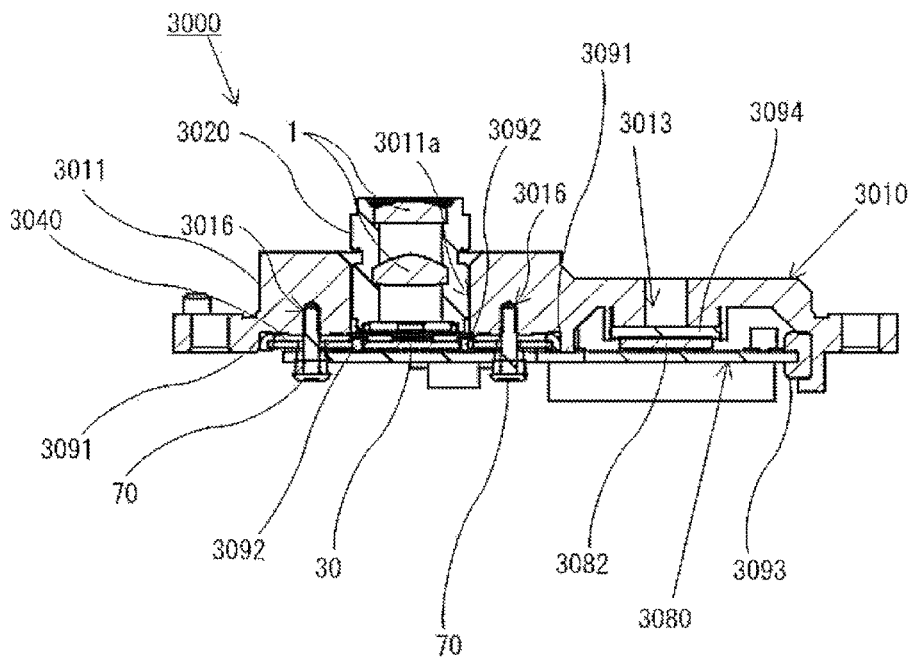
FIG. 15B is a cross-sectional arrow view at the section A-A in FIG. 15A of the imaging device of the further example.

As illustrated in FIG. 14, the imaging device 3000 according to the present example is provided with a lens barrel 3020, a base member 3010, an imaging element 30, a communicating module 3082 (a second electronic component), a circuit board 3080, and a securing plate 3040. Moreover, the imaging device 3000 is further provided with adhesive agents 3091, 3092, and 3093, screws 70 (referencing FIG. 15B), and heat dissipating grease 3094. Note that structures that are identical to those in the previous examples are assigned reference symbols that are the same as those in FIG. 1. In the imaging device 3000, as illustrated in FIG. 15A, the lens barrel 3020 is secured to a position that is offsetted to one side from the center portion in the lengthwise direction of the base member 3010 that is long when viewed from the front face side. Moreover, as illustrated in FIG. 15B, the imaging element 30 and the communicating module 3082 are disposed, on the circuit board 3080, lined up in the lengthwise direction of the base member 3010.

Returning to FIG. 14, the lens barrel 3020 is formed from a resin material, or the like, into a cylinder, and the lens group 1 is held therein.

The imaging element 30 and the communicating module (an electronic component) 3082 are mounted on the same side of the circuit board 3080. Two through holes 3081, into which screws 70 (referencing FIG. 15B) are inserted, are formed on both sides of the imaging element 30 in the circuit board 3080. The circuit board 3080 is disposed so that the side whereon the imaging element 30 and the communicating module 3082 are mounted faces the lens barrel 3020 side.

The base member 3010 holds the lens barrel 3020 in a state wherein the lens barrel 3020 is secured by a locking screw 3002. This base member 3010 is disposed so as to cover the surface side of the circuit board 3080 wherein the imaging element 30 and the communicating module 3082 are mounted. The base member 3010 is formed from a material with relatively high thermal conductivity, such as metal. The base member 3010 is provided with a lens barrel holding portion 3011 for holding a lens barrel 3020, and a module covering portion 3019, provided adjacent to the lens barrel holding portion 3011, for covering the communicating module 3082. The lens barrel holding portion 3011 is provided with a through hole 3011a into which the lens barrel 3020 is fitted, and a through hole 3012 that extends in a direction that is essentially perpendicular to the axis of the through hole 3011a. The through hole 3012 has female threads, for screwing together with the locking screw 3002, formed in the inner peripheral surface thereof. The base member 3010 holds the lens barrel 3020 in a state wherein the tip end portion of the locking screw 3002 that is inserted into the through hole 3012 is in pressed against the outer peripheral side surface of the lens barrel 3020 that is fitted into the through hole 3011a. Moreover, as illustrated in FIG. 15B, the base member 3010 is provided with screw holes 3016, into which the screws 70 are screwed, and a through hole (a fourth through hole) 3013 that structures a grease filling duct for filling heat dissipating grease 3094 between the base member 3010 and the communicating module 3082. This through hole 3013 is formed, in the base member 3010, in a position that faces the communicating module 3082 in a direction that is perpendicular to the surface of the circuit board 3080 on which the imaging element 30 and the communicating module 3082 are mounted.

The securing plate 3040 is formed in a plate shape from metal, or the like. An essentially rectangular opening portion 3041 that is slightly larger than the external dimension of the imaging element 30, in the plan view, and two through holes 3042, through which screws 70 (referencing FIG. 15B) are passed, are provided in the securing plate 3040. The imaging element 30 is secured to the securing plate 3040 through an adhesive agent 3092 that is filled between the outer edge thereof and the inner edge of the opening portion 3041 of the securing plate 3040. The adhesive agent 3092 is cured through, for example, exposure to ultraviolet radiation.

As illustrated in FIG. 15B, screws 70 are screwed into the base member 3010. The screws 70 are to prevent the securing plate 3040 and the circuit board 3080 from becoming detached from the base member 3010. Moreover, in a state wherein the screws 70 are screwed into the screw holes 3016 of the base member 3010 and the tip end portions of the shaft portions of the screws 70 are in contact with the bottoms of the screw holes 3016, a gap is secured between the base member 3010 and the securing plate 3040.

Returning to FIG. 14, an adhesive agent 3091 is filled between the base member 3010 and the securing plate 3040. The adhesive agent 3091 is filled between the base member 3010 and the securing plate 3040 in a state wherein the base member 3010 is in contact with the securing plate 3040.

The adhesive agent 3091 attaches the securing plate 3040 to the base member 3010 in either the provisionally secured state, wherein the securing plate 3040 is secured provisionally to the base member 3010, or the secured state, wherein the securing plate 3040 is secured to the base member 3010. Here, in the provisionally secured state, the state is one wherein the securing plate 3040 can move, relative to the base member 3010, in a direction that crosses the optical axis L of the lens group 1. Moreover, in the provisionally secured state, the adhesive agent 3091 is in a fluid state, in the secured state it is in a cured state. The adhesive agent 3091 is structured from an adhesive agent that is converted, through exposure to ultraviolet radiation, for example from a state that has fluidity to a state that is hard.

An adhesive agent 3093 is filled between the base member 3010 and the circuit board 3080, on the side of the circuit board 3080 with the communicating module 3082. The adhesive agent 3093 is cured through, for example, exposure to ultraviolet radiation.

The heat dissipating grease 3094, as illustrated in FIG. 15B, is interposed between the base member 3010 and the communicating module 3082, and is for carrying, to the base member 3010, the heat that is produced in the communicating module 3082. The heat dissipating grease 3094 is filled between the base member 3010 and the circuit board 3080 through the through holes 3013 of the base member 3010 in a state wherein the screws 70 that have been inserted through the through holes 3081 of the circuit board 3080 and the through holes 3042 of the securing plate 3040 have been screwed into the screw holes 3016 of the base member 3010.

The method for manufacturing the imaging device 3000 according to the present example will be explained next. First the securing plate 3040 and the circuit board 3080 are disposed behind the base member 3010 that is holding the lens barrel 3020. Following this, as illustrated in FIG. 15B, the shaft portions of the screws 70 are inserted, from the rear of the circuit board 3080, into the through holes 3042 of the securing plate 3040 and the through holes 3081 of the circuit board 3080, and screwed into the screw holes 3016 of the base member 3010.

Following this, the adhesive agents 3091 and 3092 are filled between back face side of the base member 3010 and the securing plate 3040, and the adhesive agent 3093 is filled between the base member 3010 and the circuit board 3080 on the circuit board 3080 side. At this time, the adhesive agent 3091 is in a fluid state, to produce the provisionally secured state wherein the securing plate 3040 can move, relative to the base member 3010, in a direction that crosses the optical axis L of the lens group 1.

Following this, after the adjustment of the optical axis using a centering adjusting instrument (not shown), the adhesive agents 3091, 3092, and 3093 are exposed to ultraviolet radiation, to cure the adhesive agents 3091, 3092, and 3093. At this time, a secured state is produced, wherein the securing plate 3040 is secured to the base member 3010.

Finally, the heat dissipating grease 3094 is filled into the base member 3010 through the through hole 3013. In this case, a syringe (not shown), for example, that is filled with heat dissipating grease is inserted into the through hole 3013, and the heat dissipating grease 3094 is filled between the base member 3010 and the circuit board 3080.

As explained above, in the imaging device 3000 according to the present example, the adjustment of the optical axis of the imaging element 30 is carried out in a provisionally-secured state wherein the securing plate 3040 is first provisionally secured to the base member 3010. Following this, the adhesive agent 3091 that is interposed between the base member 3010 and the securing plate 3040 is cured, to produce the secured state, wherein the securing plate 3040 is secured to the base member 3010. This enables the adjustment of the optical axis of the lens group 1 to be carried out easily and with good accuracy.

Conventionally, the coating of the heat dissipating grease onto the circuit board typically is performed prior to adjusting the optical axis of the imaging element 30. In such a case, the heat dissipating grease that has been coated onto the circuit board interferes with the base member 10, and the like, when the optical axis of the imaging element 30 is adjusted, which may reduce the accuracy of the adjustment of the optical axis.

In contrast, in the imaging device 3000 according to the present example, the adhesive agents 3091 and 3092 that are interposed between the base member 3010 and the securing plate 3040 are cured after adjustment of the optical axis of the imaging element 30, after which the heat dissipating grease 3094 is filled. Because the adhesive agents 3091 and 3092 have been cured, this enables prevention of shifting of the optical axis of the imaging element 30 when the heat dissipating grease 3094 is filled.

While examples according the present invention have been explained above, the present invention is not limited to the examples set forth above. For example, the securing plate 40 may be structured with a single chucking portion 43 instead, or with three or more chucking portions 43. In these cases, the number of centering adjusting pins T used in adjusting the optical axis of the lens group 1 should be selected depending on the number of chucking portions 43.

In the examples, set forth above, the explanation was for a structure that was provided with a pressing member 60 that was formed from a material that can undergo elastic deformation, and provided with screws 70 for connecting the pressing member 60 to the base member 10; however, insofar as the securing plate 40 can be pressed and held against the base member 10 in a state wherein the position thereof can be adjusted, there is no limitation to being a structure that is provided with this pressing member 60 and these of screws 70. That is, the structure may be one with a pressing member and securing members of forms other than those explained in the previous example, or one with a pressing member and securing member is formed from other materials.

In the initial example described above, the explanation was for a structure wherein the lens barrel 20 was attached to the base member 10 through the male threaded portion 22 of the lens barrel being 20 threaded into the female threaded portion 11a that is formed in the through hole 11 of the base member 10. However, the method for attaching the lens barrel 20 to the base member 10 is not limited thereto. For example, the structure may be one wherein the lens barrel 20 is secured to the base member 10 through screws, or may be one wherein securing to the base member 10 is through some other securing member.

While in the initial example, set forth above, the explanation was for a structure that was equipped with a leaf spring 50, there is no limitation thereto, but rather the structure may be one that is provided with a compression-type coil spring, or the like, instead of the leaf spring 50.

In the initial example, described above, the explanation was for a structure that was equipped with both a base member 10, which has a front guiding portion 11b and a back guiding portion 11c, and a lens barrel 20, which has a front guiding portion 23 and a back guiding portion 24. However, there is no limitation thereto, but instead the structure may be one wherein, for example, the base member has only a back guiding portion or a front guiding portion, and the lens barrel has only a back guiding portion or a front guiding portion.

Moreover, while in the initial example, described above, the explanation was for a case wherein the guiding portions (the front guiding portion 11b and the back guiding portion 11c) contact guided portions (the front guiding portion 23 and the back guiding portion 24), the shapes of the guiding portions and of the guided portions are not limited thereto, but rather the structure may be, for example, one wherein a portion of the guiding portion contacts the guided portion.

While in the initial example, set forth above, the explanation was for an example wherein a lens group 1 is held in the lens barrel 20, there is no limitation thereto, but rather, for example, the structure may be one wherein the lens barrel 20 holds diaphragms, filters, or the like.

In the other example, described above, the explanation was for an example wherein a portion of the electronic components 2083 were disposed in the vicinity of a boundary part with the facing portion 2085 of the extending portion 2084 of the circuit board 2080, but the arrangement of the electronic components 2083 is not limited thereto. For example, the structure may be one wherein all of the electronic components 2083 are disposed on the facing portion 2085.

While in each of the examples described above the explanations were for examples wherein the imaging devices 1000, 2000, and 3000 were provided with lens groups 1 that were structured from two lenses, the number of lenses for structuring the lens group 1 is not limited to 2. The lens group 1 may be structured from a single lens, or may be structured from three or more lenses.

Moreover, while in the various examples set forth above the explanations were for examples wherein the securing plate securing member was a securing plate securing member that included both a pressing member 60 and an adhesive agent 91, the same effects are produced as in the securing plate securing member that includes both the pressing member 60 and the adhesive agent 91 insofar as it is a member that can attach the securing plate 40 to the base member 10, such as, for example, a material for thermal bonding, solder, or the like.

The present invention may be embodied and modified in a variety of ways without deviating from the spirit or intent of the present invention, as broadly defined. Moreover, the examples set forth above are to explain this invention, and do not limit the scope of the present invention. That is, the scope of the present invention is defined by the claims, not the examples. Moreover, various modifications carried out within the scope of meaning of the invention within the claims or equivalents thereto are considered to be within the scope of the present invention.

The present invention can is well suited, of course, as an imaging device for a vehicle-mounted camera, a monitoring camera, or the like, and is also useful in digital cameras, video cameras, and other imaging devices for recognition or imaging (such as, cameras for medical treatments such as endoscope cameras, camcorders (movie cameras) for capturing video, various types of inspection cameras, cameras for robots, and the like), and also useful in electronic devices such as mobile telephones, tablets, personal computers, and the like.

The invention claimed is:

1. An imaging device, comprising:
a lens group;
a lens barrel holding the lens group;
a lens barrel holding member holding the lens barrel;
an imaging element;
a securing plate that is disposed facing at least a portion of the lens barrel holding member in a state wherein the imaging element is secured; and
a securing plate securing member attaching the securing plate to the lens barrel holding member, the securing plate having two states, including:
a provisionally secured state, wherein the securing plate has been secured provisionally to the lens barrel holding member such that the securing plate moves relative to the lens barrel holding member in a direction that crosses the optical axis of the lens group, and
a secured state wherein the securing plate is secured to the lens barrel holding member.

2. The imaging device as set forth in claim 1, wherein:
the securing plate securing member comprises a pressing member for pressing the securing plate toward the lens barrel holding member in the provisionally secured state and in the secured state.

3. The imaging device as set forth in claim 2, further comprising:
a securing member securing the pressing member to the lens barrel holding member, wherein:
the pressing member is formed from a material that is elastically deformable, and comprises:
a plate-shaped flat plate portion that is disposed away from the securing plate, on the opposite side from the lens barrel holding member side of the securing plate, and that is secured to the lens barrel holding member by the securing member;
a contacting portion contacting at least a portion of the securing plate; and
a connecting portion connecting the flat plate portion and the contacting portion.

4. The imaging device as set forth in claim 3, wherein:
the lens barrel holding member comprises a screw hole;
the flat plate portion comprises a first through hole;
the securing member is structured from a screw, and is screwed into the through hole of the lens barrel holding member in a state wherein the securing member is inserted into the first through hole; and
the contacting portion is biased in a direction toward the lens barrel holding member with a biasing force that is dependent on the amount to which the securing member is screwed into the screw hole.

5. The imaging device as set forth in claim 1, further comprising:
a biasing member biasing the lens barrel in the optical axial direction of the lens group, wherein:
the lens barrel comprises a male threaded portion formed on the outer peripheral surface thereof; and
the lens barrel holding member comprises a second through hole that passes through the lens barrel holding member and into which the lens barrel is inserted, wherein a female threaded portion screwing together with the male threaded portion is formed on the inner peripheral surface of the second through hole.

6. The imaging device as set forth in claim 5, wherein:
the lens barrel holding member comprises a guiding portion for guiding the lens barrel so that the axis of the lens barrel is coincident with the axis of the second through hole; and
the lens barrel comprises a guided portion that is guided by the guiding portion.

7. The imaging device as set forth in claim 6, wherein:
the guiding portions are formed on both sides of the female threaded portion in the inner peripheral surface of the second through hole; and
the guided portions are formed on both sides of the male threaded portion on the outer peripheral surface of the lens barrel.

8. The imaging device as set forth in claim 6, wherein:
a guiding portion is formed so as to contact at least a portion of the guided portion.

9. The imaging device as set forth in claim 5, wherein:
the biasing member is structured from a spring.

10. The imaging device as set forth in claim 1, wherein:
the securing plate securing member further comprises an adhesive agent that is interposed between the securing plate and the lens barrel holding member, wherein:
in the secured state, the securing plate is secured by an adhesive agent to the lens barrel holding member.

11. The imaging device as set forth in claim 10, wherein:
the securing member comprises an adhesive agent filling portion, that, in the plan view, has a wedge shapes, for filling with the adhesive agent.

12. The imaging device as set forth in claim 1, further comprising:
a circuit board comprising the imaging element mounted on one surface side thereof and comprising a first electronic component mounted on the other surface side thereof, disposed on the opposite side of the securing plate from the lens barrel holding member, wherein:
the securing plate securing member is structured from an adhesive agent that is interposed between the lens barrel holding member, the circuit board, and the securing plate, and is in a fluid state in the provisionally secured state, and a cured state in the secured state.

13. The imaging device as set forth in claim 12, wherein:
the first electronic component is mounted on the circuit board, on the other surface side that is not the facing portion that faces the lens barrel holding member in the direction of the optical axis of the lens group.

14. The imaging device as set forth in claim 13, wherein:
the circuit board is structured from a sheet-shaped flexible printed circuit board and further comprises an extending portion that extends from the facing portion; and
a portion of the adhesive agent is interposed between the lens barrel holding member and the extending portion.

15. The imaging device as set forth in claim 12, further comprising:
a securing member that is long and thin, securing the lens barrel holding member in a state wherein the lens barrel holding member protrudes toward the imaging element side, wherein:
the securing plate comprises a third through hole through which the securing member is inserted, passing through in the direction of thickness of the securing plate, in a state wherein there is a gap from the side face of the securing member, at a position that corresponds to the securing member that is secured to the lens barrel holding member; and
a portion of the adhesive agent is disposed in a gap that is produced between the securing member and the third through hole.

16. The imaging device as set forth in claim 12, further comprising:
a second electronic component that is mounted on the one side surface of the circuit board; and
a heat dissipating grease, interposed between the lens barrel holding member and the second electronic component, transmitting, to the lens barrel holding member, the heat that is produced by the second electronic component, wherein:
the lens barrel holding member is disposed so as to cover the one surface side of the circuit board, and has a grease filling duct filling the heat dissipating grease between the lens barrel holding member and the second electronic component.

17. The imaging device as set forth in claim 16, wherein:
the grease filling duct is structured in the lens barrel holding member from a fourth through hole that is formed in a position that faces the second electronic component in a direction that is perpendicular to the face of the circuit board on which the imaging element and the second electronic component are mounted.

18. An optical device equipped with an imaging device as set forth in claim 1.

19. An electronic device comprising an imaging device as set forth in claim 1.

20. A vehicle equipped with an imaging device as set forth in claim claim 1.

21. A method for manufacturing an imaging device, comprising the steps of:
securing a lens group in a lens barrel;
holding the lens barrel in a lens barrel holding member;
disposing the securing plate, to which the imaging element is secured, facing at least a portion of the lens barrel holding member;
holding the securing plate by the securing plate securing member in a state wherein the imaging element moves, relative to the lens barrel holding member, in a direction that crosses the optical axis of the lens group; and
securing the imaging element to the lens barrel holding member by the securing plate securing member.

* * * * *